(12) United States Patent  (10) Patent No.: US 8,634,137 B2
Powers et al.  (45) Date of Patent: *Jan. 21, 2014

(54) GLARE MANAGEMENT OF REFLECTIVE AND THERMOREFLECTIVE SURFACES

(75) Inventors: Richard M. Powers, Lakewood, CO (US); Wil McCarthy, Lakewood, CO (US)

(73) Assignee: Ravenbrick LLC, Denver, CO (US)

( * ) Notice: Subject to any disclaimer, the term of this patent is extended or adjusted under 35 U.S.C. 154(b) by 427 days.

This patent is subject to a terminal disclaimer.

(21) Appl. No.: 12/429,092

(22) Filed: Apr. 23, 2009

(65) Prior Publication Data

US 2009/0268273 A1  Oct. 29, 2009

Related U.S. Application Data

(60) Provisional application No. 61/047,400, filed on Apr. 23, 2008, provisional application No. 61/083,138, filed on Jul. 23, 2008, provisional application No. 61/084,940, filed on Jul. 30, 2008, provisional application No. 61/146,207, filed on Jan. 21, 2009, provisional application No. 61/157,076, filed on Mar. 3, 2009.

(51) Int. Cl.
*G02B 5/30* (2006.01)

(52) U.S. Cl.
USPC ............ 359/485.01; 359/488.01; 359/490.01; 359/494.01; 359/599; 359/601

(58) Field of Classification Search
USPC ............. 359/485.01, 485.05, 485.07, 488.01, 359/490.01, 493.01, 494.01, 591–599, 359/601–602, 609, 613, 614, 890
See application file for complete search history.

(56) References Cited

U.S. PATENT DOCUMENTS

| | | |
|---|---|---|
| 3,990,784 A | 11/1976 | Gelber |
| 4,006,730 A | 2/1977 | Clapham et al. |
| 4,155,895 A | 5/1979 | Rohowetz et al. |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |

(Continued)

FOREIGN PATENT DOCUMENTS

| | | |
|---|---|---|
| CA | 2620005 A1 | 7/2008 |
| CN | 1189224 A | 7/1998 |

(Continued)

OTHER PUBLICATIONS

Author Unknown, "Liquid Crystal Research," http://chirality.swarthmore.edu, printed Aug. 21, 2009.

(Continued)

*Primary Examiner* — Frank Font
(74) *Attorney, Agent, or Firm* — Dorsey & Whitney LLP

(57) ABSTRACT

The reflectivity and transmissivity of building and vehicle surfaces is maintained while employing partial, variable, selective, or asymmetric diffusers between a surface and an external light source such that the reflected light is diffused to produce a reduction in glare, while minimally effecting the specular or collimated transmission (if any) of light through the surface. Glare is also reduced by utilizing diffuser devices that reflect light in a temperature dependent manner.

9 Claims, 7 Drawing Sheets

(56) References Cited

U.S. PATENT DOCUMENTS

| | | | |
|---|---|---|---|
| 4,579,638 A | 4/1986 | Scherber | |
| 4,640,583 A | 2/1987 | Hoshikawa et al. | |
| 4,641,922 A | 2/1987 | Jacob | |
| 4,688,900 A | 8/1987 | Doane et al. | |
| 4,688,901 A | 8/1987 | Albert | |
| 4,755,673 A | 7/1988 | Pollack et al. | |
| 4,756,758 A | 7/1988 | Lent et al. | |
| 4,783,150 A | 11/1988 | Tabony | |
| 4,789,500 A | 12/1988 | Morimoto et al. | |
| 4,804,254 A | 2/1989 | Doll et al. | |
| 4,848,875 A | 7/1989 | Baughman et al. | |
| 4,859,994 A | 8/1989 | Zola | |
| 4,871,220 A | 10/1989 | Kohin | |
| 4,877,675 A | 10/1989 | Falicoff et al. | |
| 4,893,902 A | 1/1990 | Baughman et al. | |
| 4,899,503 A | 2/1990 | Baughman et al. | |
| 4,964,251 A | 10/1990 | Baughman et al. | |
| 5,009,044 A | 4/1991 | Baughman et al. | |
| 5,013,918 A | 5/1991 | Choi | |
| 5,025,602 A | 6/1991 | Baughman et al. | |
| 5,111,629 A | 5/1992 | Baughman et al. | |
| 5,132,147 A | 7/1992 | Takiguchi | |
| 5,152,111 A | 10/1992 | Baughman et al. | |
| 5,193,900 A | 3/1993 | Yano et al. | |
| 5,196,705 A | 3/1993 | Ryan | |
| 5,197,242 A | 3/1993 | Baughman et al. | |
| 5,212,584 A | 5/1993 | Chung | |
| 5,227,115 A | 7/1993 | Harnischfeger | |
| 5,274,246 A | 12/1993 | Hopkins | |
| 5,304,323 A | 4/1994 | Arai et al. | |
| 5,308,706 A | 5/1994 | Kawaguchi et al. | |
| 5,319,478 A | 6/1994 | Funfschilling et al. | |
| 5,347,140 A | 9/1994 | Hirai | |
| 5,377,042 A | 12/1994 | Chahroudi | |
| 5,481,400 A | 1/1996 | Borden | |
| 5,525,430 A | 6/1996 | Chahroudi | |
| 5,530,263 A | 6/1996 | DiVincenzo | |
| 5,574,286 A | 11/1996 | Huston et al. | |
| 5,585,640 A | 12/1996 | Huston | |
| 5,757,828 A | 5/1998 | Ouchi | |
| 5,763,307 A | 6/1998 | Wang | |
| 5,881,200 A | 3/1999 | Burt | |
| 5,889,288 A | 3/1999 | Futatsugi | |
| 5,897,957 A | 4/1999 | Goodman | |
| 5,937,295 A | 8/1999 | Chen | |
| 5,940,150 A | 8/1999 | Faris et al. | |
| 6,040,859 A | 3/2000 | Takahashi | |
| 6,099,758 A | 8/2000 | Verrall et al. | |
| 6,122,103 A | 9/2000 | Perkins et al. | |
| 6,208,463 B1 | 3/2001 | Hansen | |
| 6,218,018 B1 | 4/2001 | McKown et al. | |
| 6,226,067 B1 | 5/2001 | Nishiguchi et al. | |
| 6,240,114 B1 | 5/2001 | Anselm | |
| 6,260,414 B1 | 7/2001 | Brown et al. | |
| 6,281,519 B1 | 8/2001 | Sugiyama et al. | |
| 6,288,840 B1 | 9/2001 | Perkins et al. | |
| 6,294,794 B1 | 9/2001 | Yoshimura et al. | |
| 6,304,784 B1 | 10/2001 | Allee | |
| 6,320,220 B1 | 11/2001 | Watanabe | |
| 6,329,668 B1 | 12/2001 | Razeghi | |
| 6,333,516 B1 | 12/2001 | Katoh | |
| 6,381,068 B1 | 4/2002 | Harada et al. | |
| 6,437,361 B1 | 8/2002 | Matsuda | |
| 6,446,402 B1 | 9/2002 | Byker et al. | |
| 6,486,997 B1 | 11/2002 | Bruzzone et al. | |
| 6,487,112 B1 | 11/2002 | Wasshuber | |
| 6,493,482 B1 | 12/2002 | Al-hemyari et al. | |
| 6,498,354 B1 | 12/2002 | Jefferson | |
| 6,504,588 B1 | 1/2003 | Kaneko | |
| 6,512,242 B1 | 1/2003 | Fan et al. | |
| 6,559,903 B2 | 5/2003 | Faris et al. | |
| 6,583,827 B2 | 6/2003 | Faris et al. | |
| 6,600,169 B2 | 7/2003 | Stintz | |
| 6,611,640 B2 | 8/2003 | LoCasclo | |
| 6,635,898 B2 | 10/2003 | Williams et al. | |
| 6,661,022 B2 | 12/2003 | Morie | |
| 6,671,008 B1 | 12/2003 | Li et al. | |
| 6,710,823 B2 | 3/2004 | Faris et al. | |
| 6,718,086 B1 | 4/2004 | Ford | |
| 6,730,909 B2 | 5/2004 | Butler | |
| 6,753,273 B2 | 6/2004 | Holonyak, Jr. et al. | |
| 6,770,916 B2 | 8/2004 | Ohshima | |
| 6,777,718 B2 | 8/2004 | Takagi | |
| 6,816,525 B2 | 11/2004 | Stintz et al. | |
| 6,847,662 B2 | 1/2005 | Bouda et al. | |
| 6,859,114 B2 | 2/2005 | Eleftheriades | |
| 6,912,018 B2 | 6/2005 | Faris et al. | |
| 6,926,952 B1 | 8/2005 | Weber et al. | |
| 6,933,812 B2 | 8/2005 | Sarabandi | |
| 6,946,697 B2 | 9/2005 | Pietambaram | |
| 6,963,435 B2 | 11/2005 | Mallya et al. | |
| 6,965,420 B2 | 11/2005 | Li et al. | |
| 6,978,070 B1 | 12/2005 | McCarthy et al. | |
| 6,985,291 B2 | 1/2006 | Watson et al. | |
| 6,992,822 B2 * | 1/2006 | Ma et al. | 359/485.01 |
| 7,026,641 B2 | 4/2006 | Mohseni | |
| 7,038,745 B2 | 5/2006 | Weber et al. | |
| 7,042,615 B2 | 5/2006 | Richardson | |
| 7,046,441 B2 | 5/2006 | Huang | |
| 7,068,234 B2 | 6/2006 | Sievenpiper | |
| 7,099,062 B2 | 8/2006 | Azens et al. | |
| 7,113,335 B2 | 9/2006 | Sales | |
| 7,154,451 B1 | 12/2006 | Sievenpiper | |
| 7,161,737 B2 * | 1/2007 | Umeya | 359/454 |
| 7,166,797 B1 | 1/2007 | Dziendziel et al. | |
| 7,221,827 B2 | 5/2007 | Domash et al. | |
| 7,245,431 B2 * | 7/2007 | Watson et al. | 359/485.03 |
| 7,276,432 B2 | 10/2007 | McCarthy et al. | |
| 7,300,167 B2 | 11/2007 | Fernando et al. | |
| 7,318,651 B2 | 1/2008 | Chua | |
| 7,351,346 B2 | 4/2008 | Little | |
| 7,385,659 B2 * | 6/2008 | Kotchick et al. | 349/114 |
| 7,470,925 B2 | 12/2008 | Tamura | |
| 7,522,124 B2 | 4/2009 | Smith | |
| 7,532,397 B2 | 5/2009 | Tanaka | |
| 7,538,946 B2 | 5/2009 | Smith | |
| 7,561,332 B2 * | 7/2009 | Little et al. | 359/485.05 |
| 7,601,946 B2 | 10/2009 | Powers | |
| 7,619,816 B2 | 11/2009 | Deng | |
| 7,655,942 B2 | 2/2010 | McCarthy et al. | |
| 7,692,180 B2 | 4/2010 | Snyder | |
| 7,755,829 B2 * | 7/2010 | Powers et al. | 359/288 |
| 7,768,693 B2 | 8/2010 | McCarthy et al. | |
| 7,911,563 B2 | 3/2011 | Hung | |
| 7,936,500 B2 | 5/2011 | Powers | |
| 7,977,621 B2 | 7/2011 | McCarthy | |
| 8,072,672 B2 | 12/2011 | Powers et al. | |
| 8,076,661 B2 | 12/2011 | McCarthy et al. | |
| 8,169,685 B2 | 5/2012 | Powers | |
| 8,271,241 B2 | 9/2012 | Akyurtlu | |
| 8,284,336 B2 | 10/2012 | Powers | |
| 2002/0079485 A1 | 6/2002 | Stintz et al. | |
| 2002/0085151 A1 | 7/2002 | Faris et al. | |
| 2002/0114367 A1 | 8/2002 | Stintz et al. | |
| 2002/0118328 A1 | 8/2002 | Faris et al. | |
| 2002/0141029 A1 | 10/2002 | Carlson et al. | |
| 2002/0152191 A1 | 10/2002 | Hollenberg | |
| 2002/0180916 A1 | 12/2002 | Schadt et al. | |
| 2002/0190249 A1 | 12/2002 | Williams | |
| 2003/0052317 A1 | 3/2003 | Ohshima | |
| 2003/0059998 A1 | 3/2003 | Holonyak, Jr. | |
| 2003/0066998 A1 | 4/2003 | Lee | |
| 2003/0107813 A1 * | 6/2003 | Clabburn et al. | 359/599 |
| 2003/0107927 A1 | 6/2003 | Yerushalmi | |
| 2003/0129247 A1 | 7/2003 | Ju et al. | |
| 2003/0138209 A1 | 7/2003 | Chan | |
| 2003/0218712 A1 | 11/2003 | Kumar et al. | |
| 2003/0227663 A1 | 12/2003 | Agrawal | |
| 2004/0005451 A1 * | 1/2004 | Kretman et al. | 428/317.9 |
| 2004/0012749 A1 | 1/2004 | Freeman | |
| 2004/0036993 A1 | 2/2004 | Tin | |
| 2004/0256612 A1 | 12/2004 | Mohseni | |
| 2005/0068629 A1 | 3/2005 | Fernando et al. | |
| 2005/0157996 A1 | 7/2005 | McCarthy | |

(56) References Cited

U.S. PATENT DOCUMENTS

| | | |
|---|---|---|
| 2005/0157997 A1 | 7/2005 | McCarthy |
| 2005/0185125 A1 | 8/2005 | Miyachi et al. |
| 2005/0221128 A1 | 10/2005 | Kochergin |
| 2005/0271092 A1 | 12/2005 | Ledentsov |
| 2006/0011904 A1 | 1/2006 | Snyder et al. |
| 2006/0049394 A1 | 3/2006 | Snyder et al. |
| 2006/0147810 A1 | 7/2006 | Koch |
| 2006/0151775 A1 | 7/2006 | Hollenberg |
| 2006/0238867 A1* | 10/2006 | Takeda et al. ............ 359/487 |
| 2006/0257090 A1 | 11/2006 | Podolskiy et al. |
| 2006/0262398 A1 | 11/2006 | Sangu et al. |
| 2006/0274218 A1 | 12/2006 | Xue |
| 2007/0070276 A1 | 3/2007 | Tan et al. |
| 2007/0121034 A1 | 5/2007 | Ourderkirk et al. |
| 2007/0215843 A1 | 9/2007 | Soukoulis et al. |
| 2007/0279727 A1 | 12/2007 | Ghandi et al. |
| 2008/0013174 A1* | 1/2008 | Allen et al. ............. 359/487 |
| 2008/0061222 A1 | 3/2008 | Powers et al. |
| 2008/0117500 A1 | 5/2008 | Narendran et al. |
| 2008/0138543 A1 | 6/2008 | Hoshino et al. |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon |
| 2008/0259254 A1 | 10/2008 | Kikuchi et al. |
| 2009/0015902 A1 | 1/2009 | Powers et al. |
| 2009/0040132 A1 | 2/2009 | Sridhar |
| 2009/0059406 A1 | 3/2009 | Powers et al. |
| 2009/0128893 A1 | 5/2009 | McCarthy et al. |
| 2009/0128907 A1* | 5/2009 | Takahashi et al. ......... 359/488 |
| 2009/0167971 A1 | 7/2009 | Powers et al. |
| 2009/0219603 A1 | 9/2009 | Xue |
| 2009/0268273 A1 | 10/2009 | Powers et al. |
| 2009/0296190 A1* | 12/2009 | Anderson et al. ......... 359/247 |
| 2010/0001008 A1 | 1/2010 | McCarthy et al. |
| 2010/0015363 A1 | 1/2010 | Chiang et al. |
| 2010/0027099 A1 | 2/2010 | McCarthy et al. |
| 2010/0045924 A1 | 2/2010 | Powers et al. |
| 2010/0051898 A1 | 3/2010 | Kim, II |
| 2010/0060844 A1 | 3/2010 | Sawatari et al. |
| 2010/0118380 A1 | 5/2010 | Xue |
| 2010/0232017 A1 | 9/2010 | McCarthy et al. |
| 2010/0259698 A1 | 10/2010 | Powers et al. |
| 2010/0271686 A1 | 10/2010 | Powers et al. |
| 2010/0288947 A1 | 11/2010 | McCarthy et al. |
| 2011/0025934 A1 | 2/2011 | McCarthy et al. |
| 2011/0044061 A1* | 2/2011 | Santoro et al. ............ 362/355 |
| 2011/0102878 A1 | 5/2011 | McCarthy et al. |
| 2011/0205650 A1 | 8/2011 | Powers et al. |
| 2011/0216254 A1 | 9/2011 | McCarthy et al. |
| 2011/0234944 A1 | 9/2011 | Powers et al. |
| 2011/0292488 A1 | 12/2011 | McCarthy |
| 2012/0140311 A1 | 6/2012 | Powers et al. |
| 2012/0262773 A1 | 10/2012 | Powers et al. |
| 2013/0033738 A1 | 2/2013 | Powers et al. |

FOREIGN PATENT DOCUMENTS

| | | |
|---|---|---|
| CN | 1350648 A | 5/2002 |
| CN | 1494091 | 5/2004 |
| EP | 1162496 | 12/2001 |
| GB | 2261989 | 6/1993 |
| JP | 58-10717 A | 1/1983 |
| JP | 58010717 | 1/1983 |
| JP | 61223719 | 10/1986 |
| JP | 01178517 A * | 7/1989 |
| JP | 02-089426 | 3/1990 |
| JP | 06-158956 | 6/1994 |
| JP | 08-015663 | 1/1996 |
| JP | 10-287449 | 10/1998 |
| JP | 10-311189 | 11/1998 |
| JP | 2002-357815 | 12/2002 |
| JP | 2003-248204 | 9/2003 |
| JP | 2004-004795 | 1/2004 |
| JP | 2005-250119 | 9/2005 |
| JP | 2006-243485 | 9/2006 |
| JP | 2007-515661 | 6/2007 |
| JP | 2007-272016 | 10/2007 |
| JP | 2008-530766 | 8/2008 |
| KR | 10-2002-0044153 A | 2/2003 |
| KR | 10-2004-0108816 | 12/2004 |
| KR | 10-2003-0072578 | 4/2005 |
| KR | 10-2006-0000059 | 1/2006 |
| KR | 10-2007-0091314 A | 9/2007 |
| KR | 10-2010-0039401 A | 4/2010 |
| WO | 94/02313 A1 | 2/1994 |
| WO | 97/01789 A2 | 1/1997 |
| WO | 01/23173 A1 | 4/2001 |
| WO | 02/064937 A1 | 8/2002 |
| WO | 03/029885 A1 | 4/2003 |
| WO | 03/096105 A1 | 11/2003 |
| WO | 2005/031437 A1 | 4/2005 |
| WO | 2006/023195 A2 | 3/2006 |
| WO | 2006/088369 A1 | 8/2006 |
| WO | 2008/092038 A1 | 7/2008 |
| WO | 2008/144217 A1 | 11/2008 |

OTHER PUBLICATIONS

Barbagallo, S., et al., "Synthesis of novel metamaterials," Chapter 2 (VDM Verlag 2008).
Eleftheriades, G.V., et al. (Editors); Iyers, "Negative-Refraction Metamaterials," Chapter 1 (Wiley 2005), pp. 4-5, 16-30, 321-330.
Padilla, W.J., et al., "Electrically resonant terahertz metamaterials: Theoretical and experimental investigations," Physical Review B 75, 041102(R) (2007).
Rogacheva, A.V., et al., "Giant gyrotropy due to electromagnetic-field coupling in a bilayered chiral structure," Physical Review Letters 97, 177401 (Oct. 27, 2006).
Sarychev, et al., "Negative refraction metamaterials," Chapter 8 (Wiley 2005).
Zhang, W., Giant optical activity in dielectric planar metamaterials with two-dimensional chirality, Journal of Optics A: Pure and Applied Optics, 8, pp. 878-890 (2006).
Notice of Allowance, U.S. Appl. No. 12/019,602, dated Jun. 9, 2010.
Fedotov, V. A., et al., "Asymmetric Propagation of Electromagnetic Waves through a Planar Chiral Structure," The American Physical Society, PRL 97, Oct. 20, 2006, pp. 167401-1-167401-4.
Ginley, D. S., et al., "Transparent Conducting Oxides," MRS Bulletin, Aug. 2000, pp. 15-18.
Goldhaber-Gordon, David, et al., "Overview of Nanoelectronic Devices," Proceedings of the IEEE, vol. 85, No. 4 (Apr. 1997), pp. 521-533.
Harrison, "Quantum Wells, Wires, and Dots: Theoretical & Computational Physics of Semiconductor Nanostructures" 2nd Edition, John Wiley & Sons, Ltd (2005), 3 pages.
Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.
Leatherdale, C.A., et al., "Photoconductivity in CdSe Quantum Dot Solids," Physical Review B, vol. 62, No. 4 (Jul. 15, 2000), pp. 2669-2680.
Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.
Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.
Siegel, J. D., "The MSVD Low E 'Premium Performance' Myth," International Glass Review, Issue 1, 2002, pp. 55-58.
Korean Intellectual Property Office as International Searching Authority, International Search Report and Written Opinon for International Application No. PCT/US2008/051959, Jun. 3, 2008, 10 pages.
Korean Intellectual Property Office as International Searching Authority, International Search Report and Written Opinion for International Application No. PCT/US2008/069881, Sep. 30, 2008, 10 pages.

(56) References Cited

OTHER PUBLICATIONS

Korean Intellectual Property Office as International Searching Authority, International Search Report and Written Opinion for International Application No. PCT/US2008/087964, Mar. 31, 2009, 10 pages.
Korean Intellectual Property Office as International Searching Authority, International Search Report and Written Opinion for International Application No. PCT/US2009/041576, Nov. 25, 2009, 4 pages.
Application as Filed, U.S. Appl. No. 13/150,475, filed Jun. 1, 2011, 31 pp.
Application as Filed, U.S. Appl. No. 13/100,000, filed May 3, 2011, 33 pp.
Application as Filed, U.S. Appl. No. 13/107,626, filed May 13, 2011, 56 pp.
Notice of Allowance mailed Aug. 22, 2011, U.S. Appl. No. 12/830,068, filed Jul. 2, 2010, 7 pp.
Notice of Allowance, mailed Jul. 22, 2011, U.S. Appl. No. 12/843,218, filed Jul. 26, 2010, 8 pp.
Hao, J. et al., "Manipulating Electromagnetic Wave Polarizations by Anisotropic Metamaterials", Physical Review Letters, 2007, vol. 99, No. 063908, 4 pp.
Sarychev, et al., "Negative refraction metamaterials,", Chapter 8 (Wiley 2005), 313-337.
Sung, J. et al., "Dynamics of photochemical phase transition of guest/host liquid crystals with an Azobenzene derivative as a photoresponsive chromophore", Chemistry of Materials, vol. 14, No. 1, 2002, 385-391.
West, J. L. et al., "Characterization of polymer dispersed liquid-crystal shutters by ultraviolet/visible and infrared absorption spectroscopy", Journal of Applied Physics, vol. 70, No. 7, Oct. 1991, 3785-3790.
U.S. Appl. No. 12/903,856, filed Oct. 13, 2010.
U.S. Appl. No. 12/916,233, filed Oct. 29, 2010.
U.S. Appl. No. 13/074,876, filed Mar. 29, 2011.
Fan, et al., "Thin-film conducting microgrids as transparent heat mirrors", Appl. Phys. Lett., vol. 28, No. 8, Apr. 5, 1976, 440-442.
Yamazaki et al., "Polarisation-insensitive parametric wavelength conversion without tunable filters for converted light extraction," *Electronics Letters* (Mar. 16, 2006), 42(6):365-367.
Extended European Search Report dated Nov. 28, 2011, EP Application No. 09734848.6, 18 pages.
First Office Action dated Dec. 23, 2011 (with English summary), CN Application No. 200980123601.9, 7 pages.
Response to First Office Action dated Jul. 7, 2012 (with English summary), CN Application No. 200980123601.9, 27 pages.
First Office Action dated Jan. 6, 2012 (with English comments), KR Application No. 10-2010-7026103, 7 pages.
Response to First Office Action dated Jul. 6, 2012 (with English summary), KR Application No. 10-2010-7026103, 37 pages.
U.S. Appl. No. 13/646,907, filed Oct. 8, 2012, 24 pages.
First Office Action dated May 10, 2011, AU Application No. 2009240500, 2 pages.
First Office Action dated Aug. 1, 2011, AU Application No. 2009240500, 1 page.
Notice of Allowance dated Aug. 26, 2011, AU Application No. 2009240500, 3 pages.
First Office Action dated Nov. 29, 2011, CA Application No. 2,754,619, 4 pages.
Response to First Office Action dated May 29, 2013, CA Application No. 2,754,619, 35 pages.
Second Office Action dated Nov. 28, 2012 (with English summary), CN Application No. 200980123601.9, 7 pages.
Response to Second Office Action dated Apr. 18, 2013 (with English summary), CN Application No. 200980123601.9, 11 pages.
Extended Search Report, dated Nov. 28, 2011, EP Application No. 09734848.6, 18 pages.
Communication pursuant to Rules 70(2) and 70(3), dated Dec. 15, 2011, EP Application No. 09734848.6, 1 page.
Response to Search Report, filed Jun. 19, 2012, EP Application No. 09734848.6, 10 pages.
Second Office Action, dated Nov. 29, 2012 (with English summary), KR Application No. 10-2010-7026103, 4 pages.
Response to Second Office Action, dated 29 Mar. 29, 2013 (with English summary), KR Application No. 10-2010-7026103, 17 pages.
Notice of Allowance, dated Jun. 3, 2013 (with English summary), KR Application No. 10-2010-7026103, 3 pages.

\* cited by examiner

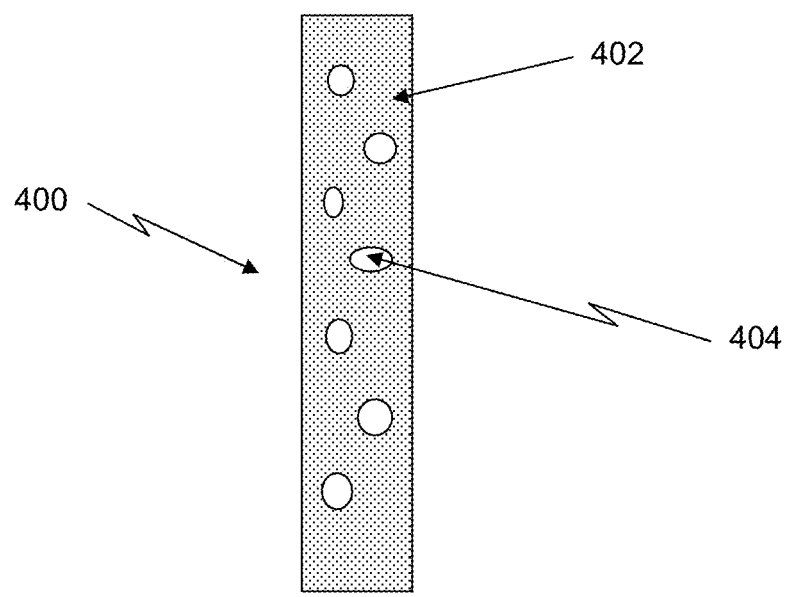
FIG 4
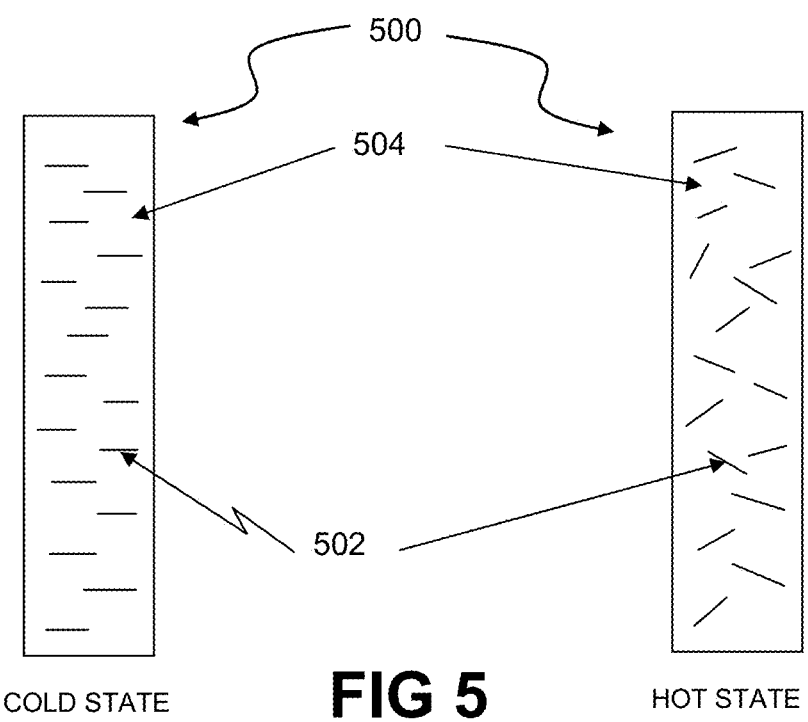
COLD STATE  FIG 5  HOT STATE

GLARE MANAGEMENT OF REFLECTIVE AND THERMOREFLECTIVE SURFACES

CROSS REFERENCE TO RELATED APPLICATIONS

This application claims priority pursuant to 35 U.S.C. §119 (e) to the following: U.S. provisional patent application No. 61/047,400 entitled "Glare management method for reflective and thermoreflective surfaces" filed 23 Apr. 2008; U.S. provisional patent application No. 61/083,138 entitled "Glare management method for reflective and thermoreflective surfaces" filed 23 Jul. 2008; U.S. provisional patent application No. 61/084,940 entitled "Glare management method for reflective and thermoreflective surfaces" filed 30 Jul. 2008; U.S. provisional patent application No. 61/146,207 entitled "Glare management method for reflective and thermoreflective surfaces" filed 21 Jan. 2009; and U.S. provisional patent application No. 61/157,076 entitled "Glare management method for reflective and thermoreflective surfaces" filed 3 Mar. 2009, the disclosures of which are hereby incorporated herein by reference in their entirety.

This application is also related to U.S. patent application Ser. No. 12/019,602 entitled "Thermally switched optical downconverting filter" filed 24 Jan. 2008; U.S. patent application Ser. No. 12/172,156 entitled "Thermally switched reflective optical shutter" filed 14 Jul. 2008; and U.S. patent application Ser. No. 12/340,552 entitled "Thermally switched absorptive window shutter" filed 19 Dec. 2008, the disclosures of which are hereby incorporated herein by reference in their entirety.

BACKGROUND

1. Field of Technology

This disclosure relates to the mitigation of glare from reflective surfaces, for example, mirrored windows in a building.

2. Description of the Related Art

Partially reflective window coatings (e.g., thin films of sputtered metal) and films (e.g., metal-impregnated and Bragg mirror polymer films) have been widely used for decades as a method for reducing solar heat gain and thus improving the energy performance of buildings. The design, composition, and benefits of reflective coatings are well documented and need no further elaboration here, except to note that the reduction in solar heat gain, while clearly beneficial in hot, sunny conditions, may be detrimental in cold weather as it interferes with passive solar heating.

Switchable mirrors also exist which are based on reversible metal hydride and metal lithide chemistry described, for example, in U.S. Pat. No. 7,042,615 to Richardson. These switchable mirrors, which are analogous to rechargeable batteries, may rely on the physical migration of ions across a barrier under the influence of an electric field and, therefore, have limited switching speeds and cycle lifetimes. In addition, electrically operated "light valves" that combine liquid crystals with one or more reflective polarizers are described, for example, in U.S. Pat. No. 6,486,997 to Bruzzone et al. In these devices, a liquid crystal typically serves as an electrotropic depolarizer, i.e., a means of variably altering or rotating the polarity of the light that passes through it under the influence of an electric field. Some of these devices can be thought of as switchable mirrors, although they are rarely described that way, since their primary application is in video displays and advanced optics.

Switchable electric light valves which do not require polarizers but are diffusive forward scatterers or diffusive reflectors also exist. This is because liquid crystals may in fact be Bragg reflectors with different reflection bands in these applications, with a reflective, diffusive, or forward-scattering mode, and a more transmissive mode. These include the polymer-dispersed liquid crystal (PDLC) display, the cholesteric liquid crystal display (Ch-LCD), the Halmeier display, and the Guest-Host display. The PDLC is an electrochromic device where the index of refraction of liquid crystal droplets embedded in another material is changed electrically, resulting in more scattering of the light in one mode than another. The Ch-LCD has two stable states, the reflective planar and focal conic texture. The reflective planar structure reflects light if the Bragg reflection condition is met and thus acts as a Bragg reflector for one circular polarization of light, while the reflective focal conic transmits more of the light. The Guest-host display utilizes dyes dispersed in a liquid crystal, which absorb more light when in one orientation than in another. The orientation of the dyes is dependent on the orientation of the liquid crystal, which can be determined using an electric voltage. Polymer stabilized liquid crystals are created when polymers and liquid crystals are mixed and photopolymerized together to among other things establish the orientation of the liquid crystals.

In addition, U.S. Pat. No. 6,288,840 to Perkins et al., discloses a type of reflective polarizer called a "wire grid polarizer" which consists of a nanoscale array of closely spaced, parallel metal wires on a transparent substrate, such that light of one linear polarity which strikes the wires is reflected while light of opposite linear polarity is transmitted through the substrate. Wire grid polarizers may be a component of some reflective and thermoreflective optical filters. It is additionally possible to construct polarizers using distributed Bragg reflector technology, such as 3M's Dual Brightness Enhancement Film (DBEF). In these polarizers, some layers have different optical indices in one transverse direction than in another, creating a polarizer.

Any surface which presents a mirror finish in the presence of a light source, whether indoors or outdoors, has the potential to create glare, i.e., a condition in which background illumination approaches, equals, or exceeds the illumination of objects in the foreground, which in some case can lead to discomfort or reduced visibility. For this reason, mirrored films are banned or discouraged in some jurisdictions and are the subject of increased scrutiny in others.

Antireflection coatings are widely used to reduce glare from bright light sources on transparent optics such as eyeglass and binocular lenses. Reflection from a transparent surface occurs because the index of refraction of the transparent material does not match that of the surrounding medium (e.g., air, water, or vacuum). The greater the mismatch, the greater the reflection. A standard antireflection coating has an index of refraction approximately halfway between that of the transparent material and the surrounding medium. More sophisticated, nanostructured coatings (e.g., arrays of vertically oriented nanoscale cones) may present an outer surface which is mostly air and thus has an index of refraction close to air, and an inner surface which is mostly solid and has an index of refraction essentially identical to the transparent material on which it sits. In this case, reflection may be reduced virtually to zero.

However the high reflectivity of a polished metal surface, dielectric mirror, distributed Bragg reflector, or other mirror does not rely on an index of refraction mismatch with the surrounding air. Instead, reflection is achieved by photon interaction with conduction electrons (e.g., in a metal) or by constructive and destructive interference between layers of different material (e.g., in a dielectric mirror). Thus, a transparent antireflection coating will have little effect on the reflectivity of such mirrors. However, a diffusive coating will cause the reflected light to be scattered, producing a white surface which may still be highly reflective, but not specular (i.e., mirror-like) and therefore not capable of reflecting or transmitting an intelligible, collimated image.

In addition, there are numerous examples of "metamaterials" or nanostructured materials or devices which interfere with light waves in such a way that the material appears to have a negative index of refraction and thus to violate many of the presumed "laws" of classical optics. The scientific paper "*Asymmetric Propagation of Electromagnetic Waves through a Planar Chiral Structure*" (V. A. Fedotov, P. L. Mladyonov, S. L. Prosvirnin, A. V. Rogacheva, Y. Chen, and N. I. Zheludev, Physical Review Letters 97, 167401, 17 Oct. 2006) discloses a chiral, planar structure consisting of "fish scale" patterns of aluminum nanowire on a transparent substrate. In essence, the structure is a type of wire grid polarizer, although one that reflects and transmits circularly polarized light rather than linearly polarized light. Because its chiral nature is different depending on which surface of the polarizer is being observed, for light of mixed, random polarity (e.g., sunlight), this structure has an additional property of being asymmetrically transmissive, i.e., it is more transmissive to light passing through it in one direction than in the other.

In addition, there are numerous varieties of optical diffusers, including etched glass and polymer films, which partially randomize the direction of photons passing through them, while exhibiting modest reflection and very low absorption. In the case of "forward scattering" diffusers which affect the direction of most incident light by substantially less than 90 degrees, as much as 80% of the light striking the diffuser is passed through, with less than 20% being absorbed or reflected back. Diffusers are commonly employed in privacy windows, skylights, video displays, and electric lighting.

There are also so-called "one-way mirrors" which are commonly used as privacy windows, particularly in building interiors (e.g., to separate a supervisor's office from the workers being supervised). However, these are not true one-way devices. Rather, they are simply partially mirrored transparent glass, equally reflective in both directions, and the "one-way" effect requires that the area on one side of the glass be more brightly illuminated than the area on the other side. If these lighting conditions are reversed, then the privacy effect is reversed as well (e.g., the supervisor may see his own reflection, whereas the employees may have a clear view of the supervisor).

Finally, various types of prismatic films use etched structures or variable index of refraction structures to bend the light passing through them. Examples include Fresnel concentrating lenses and polymer "privacy filters" that can be applied to laptop screens or video displays to narrow or widen the viewing angle.

The information included in this Background section of the specification, including any references cited herein and any description or discussion thereof, is included for technical reference purposes only and is not to be regarded as subject matter by which the scope of the invention is to be bound.

SUMMARY

Variable, selective, or asymmetric diffusive optics may be used to mitigate the effects of glare from reflective or thermoreflective surfaces. This technology has particular, but not exclusive, application as a glare reduction method for building surfaces.

The specular reflection from a surface may be disrupted by diffusive optics placed between the surface and the outside world, thus giving the surface a diffusive (i.e., white or metallic gray) finish as opposed to a specular (i.e., mirrored) finish. However, the nature of the diffusive optics may be carefully selected such that the transmission of specular light (i.e., an image) through the exterior surface and interior surface (e.g., through a window and into a building) is minimally disrupted under selected conditions.

In one implementation, a method is provided for reducing glare from partially reflective or thermoreflective surfaces without significantly degrading the energy benefits of reflection. The method involves placing an at least partially diffusive filter between either a partially reflective surface or a thermoreflective surface and an external light source. When light is transmitted through the partially reflective surface or the thermoreflective surface, it is diffused only once. However, when light is reflected from the partially reflective surface or the thermoreflective surface, it is diffused twice, thereby transforming specular reflections from the partially reflective surface or the thermoreflective surface into diffusive reflections.

In another implementation a method is provided for increasing the privacy of transparent, translucent, or partially reflective surfaces. The method involves placing an at least partially diffusive filter between either a transparent surface, a translucent surface, or a partially reflective surface and an external light source. When light is transmitted through the transparent surface, the translucent surface, or the partially reflective surface, it is diffused only once. However, when light is reflected from the transparent, translucent, or partially reflective surface, it is diffused twice, so that the reflected light is approximately twice as diffuse as the transmitted light.

In a further implementation an energy-efficient device is disclosed that reduces glare from reflection of incident radiant energy. The device may be composed of a first diffusively reflective polarizer, a second diffusively reflective polarizer, a depolarizer positioned between the first diffusively reflective polarizer and the second polarizer, and a transparent substrate affixed to the second diffusively reflective polarizer.

In yet another implementation, an energy-efficient device is described that reduces glare from reflection of incident radiant energy. The device may be composed of a first diffusively reflective polarizer, a second diffusively reflective polarizer, a depolarizer positioned between the first diffusively reflective polarizer and the second polarizer, and a transparent substrate affixed to the second diffusively reflective polarizer In an additional implementation a diffusive polarizing filter is disclosed. The diffusive polarizing filter may be composed of a grid of wires with irregular surfaces placed in parallel at a regular spacing. The surface irregularities are larger than wavelengths of incident light resulting in reflected light from the incident light of a first polarity that is diffuse while transmitted light from the incident light of a second polarity is collimated.

In a further implementation of a diffusive polarizing filter, a grid of wires is placed on the non-planar substrate. The reflection of incident light from the diffusive polarizing filter exhibits a dependency between an incident angle of the incident light and a departure angle of the incident light that varies with a contact location of the incident light on the substrate.

In yet another implementation, a glare-reducing polarizing filter is composed of a grid of metamaterial wires that form chiral structures. The grid is more diffusive to light passing through in a first direction than to light passing through in a second, opposite direction. The grid also passes collimated light in the second direction.

In an alternative implementation, a method to improve the suitability of liquid crystal-based thermotropic, thermochromic, or thermoreflective filters and devices for low glare applications is disclosed. The method involves selecting a mixture of or including liquid crystals with suitable freezing and clearing points for operation in a given climate. Next, additives are selected to affect properties of a transition of the liquid crystals between physical states. Then, the mixture and the additives are combined to adjust or select optical properties of transmission, absorption, and/or reflection of light or energy by the filters and devices.

In another implementation, a thermotropic distributed Bragg reflector device is disclosed. The device may be composed of two or more layers of a first material that is transparent or translucent and that has a first index of refraction, and two or more layers of a second material that is thermotropic, that is transparent or translucent, and that has a variable second index of refraction. Each of the layers of the second material is interleaved with respective layers of the first material. Below a threshold temperature, the first index of refraction is substantially the same as the second index of refraction. Above the threshold temperature, the second index of refraction changes to become substantially different from the first index of refraction.

In a further implementation, a method for producing a thermoreflective effect in a first direction and a thermoabsorptive effect in a second direction is disclosed. The method includes first interleaving layers of an absorptive polarizer film and a reflective polarizer film. Second, a thermotropic depolarizer is interposed between a first set of layers of the absorptive polarizer film and the reflective polarizer film and a second set of layers of the absorptive polarizer film and the reflective polarizer film.

Use of diffusive optical sheets or films as described herein may allow builders, architects, building owners, and vehicle designers to reap the energy benefits of reflective and thermoreflective materials, while minimizing external and/or internal glare from building or vehicle surfaces. It may also provide an aesthetic alternative to mirror finishes for building and vehicle exteriors with little or no harm to energy efficiency and may further reduce reflective window glare for inside and/or outside observers while permitting a clear view of the outside for building or vehicle occupants. Such diffusive optics may provide privacy for building and vehicle interiors, similar to diffusive "privacy glass" but with significantly less effect on the view from inside.

This technology may use both specular and diffusive technologies to create windows for transparent and privacy type models of windows, and prevent the concentration of reflected solar energy in UV, visible, or IR bands in different ways. This technology may also be used to reflect or transmit, diffusively or specularly, various polarizations and frequency ranges of light in different ways at different temperatures to reduce glare.

Other features, details, utilities, and advantages of the present invention may be apparent from the following more particular written description of various embodiments of the invention as further illustrated in the accompanying drawings and defined in the appended claims.

BRIEF DESCRIPTION OF THE DRAWINGS

Please note that closely related elements have the same element numbers in all figures.

FIG. 4 is a schematic view of an implementation of a thermodiffusive filter based on temperature-dependent index of refraction or birefringence.

FIG. 5 is a schematic view of another implementation of a thermodiffusive filter based on reflective chemicals, reflective rods, or wire segments suspended or dissolved in a thermotropic liquid crystal.

DETAILED DESCRIPTION

Variable, selective, or asymmetric diffusive optics may be used to reduce specular reflection from mirrored surfaces, including reflective and thermoreflective building materials. For the purposes of this specification, the term "thermoreflective" shall refer to any object, device, or material having a reflectivity that varies as a function of temperature. Since glare is primarily a function of specular rather than diffusive reflection of a bright light source, this technology may reduce glare from building, vehicle, and other surfaces.

U.S. patent application Ser. No. 12/019,602 to McCarthy et. al. discloses "thermoreflective" window filters that are largely transparent when cold and largely reflective when hot, and which may be used to regulate the temperatures of buildings when incorporated into windows. One possible embodiment based upon the disclosure is a passive temperature-regulating film for use as a construction material, which may comprise an appliqué that can be affixed to glass windows having a single bandblock filter. For example, a thermochromic, distributed Bragg reflector (i.e., a reflector based on periodic changes in index of refraction) may be composed of a liquid crystal formulated to reflect a certain percentage of the incident visible light above a given threshold temperature and can be constructed such that its reflection band occurs in the infrared. Such a filter may offer numerous advantages over a simple mirrored film because the amount of reflectivity—and thus solar heat gain reduction—may vary significantly between hot and cold weather.

Figure 1A:
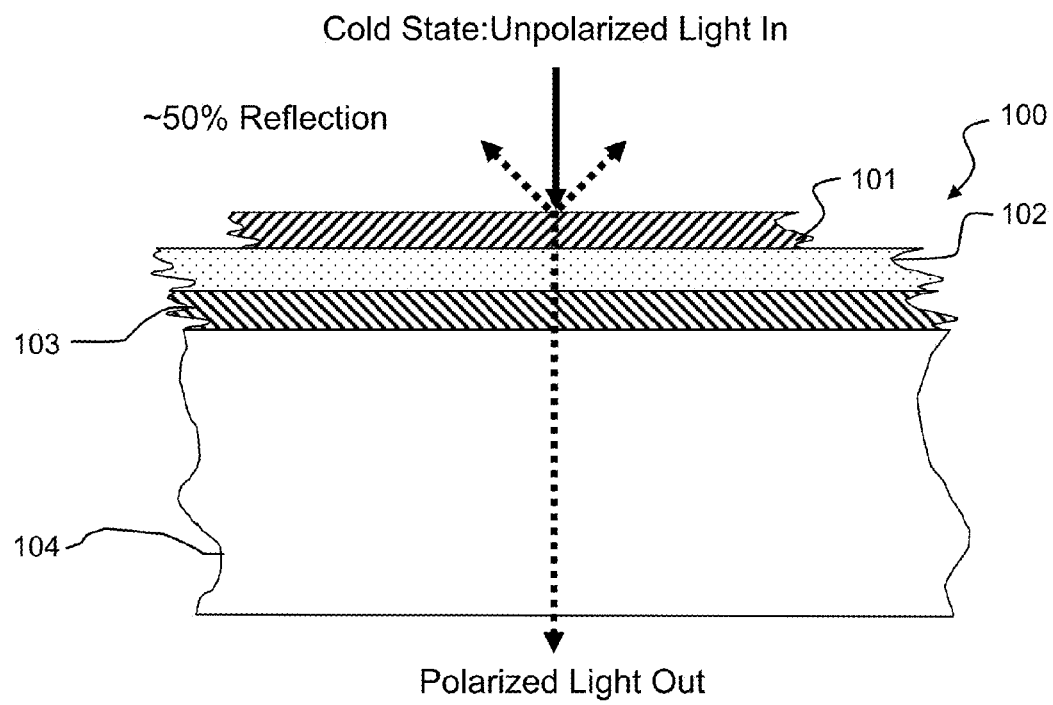
FIG. 1A is a schematic, cross-section view of a typical thermoreflective filter in its cold or transmissive state.

FIG. 1A was previously presented in, U.S. patent application Ser. No. 12/172,156 to Powers et al. and is a schematic, cross-section view of an exemplary form of thermoreflective filter device 100. The filter 100 may be composed of a thermotropic depolarizer layer 102 sandwiched between two reflective polarizing filters 101 and 103, and attached to an optional transparent substrate 104. Incoming light may first passes through the outer reflective polarizer 101. Of the incoming light, approximately 50% will have polarization perpendicular to that of the outer reflective polarizer 101 and will be reflected away.

Once it has passed through the outer reflective polarizing filter 101, the incoming light may enter the thermotropic depolarizer 102, which is a device or material capable of exhibiting two different polarizing states. In its hot or isotropic or liquid state, the polarized light passing through the thermotropic depolarizer 102 may not be affected. In its cold (e.g., nematic or crystalline) state, the thermotropic depolarizer 102 may rotate the polarization vector of the incoming light by a fixed amount.

Once it has passed through the thermotropic depolarizer 102, the remaining polarized light may strike the inner reflective polarizer 103, also known as the "analyzer," where it is either reflected or transmitted depending on its polarization state. The inner reflective polarizer 103 may be oriented such that its polarization is perpendicular to that of the outer reflective polarizer 101. Thus, in the hot state of the filter device 100, when the polarization vector of the light has not been rotated, the polarity of the light may be perpendicular to that of the inner reflective polarizer 103 and approximately 100% of it may be reflected. However, in the cold state, when the polarization vector of the light has been rotated by 90 degrees and is parallel to the inner reflective polarizer 103, a small amount of the light may be absorbed by the polarizer material and the rest may be transmitted through.

In FIG. 1A, the action of incoming light is depicted for the cold state of the filter device 100. The outer reflective polarizer 101 reflects approximately 50% of the incoming light. The remaining light passes through the thermotropic depolarizer 102, where its polarization vector is rotated, and then through the inner reflective polarizer or analyzer 103, where it is largely unaffected. The incident light then passes through an optional transparent substrate 104 and finally exits the filter device 100. Thus, in its cold state the filter device 100 serves as a "half mirror" that reflects approximately 50% of the light striking its outer surface, absorbs a small amount, and transmits the rest through to the inner surface.

Figure 1B:
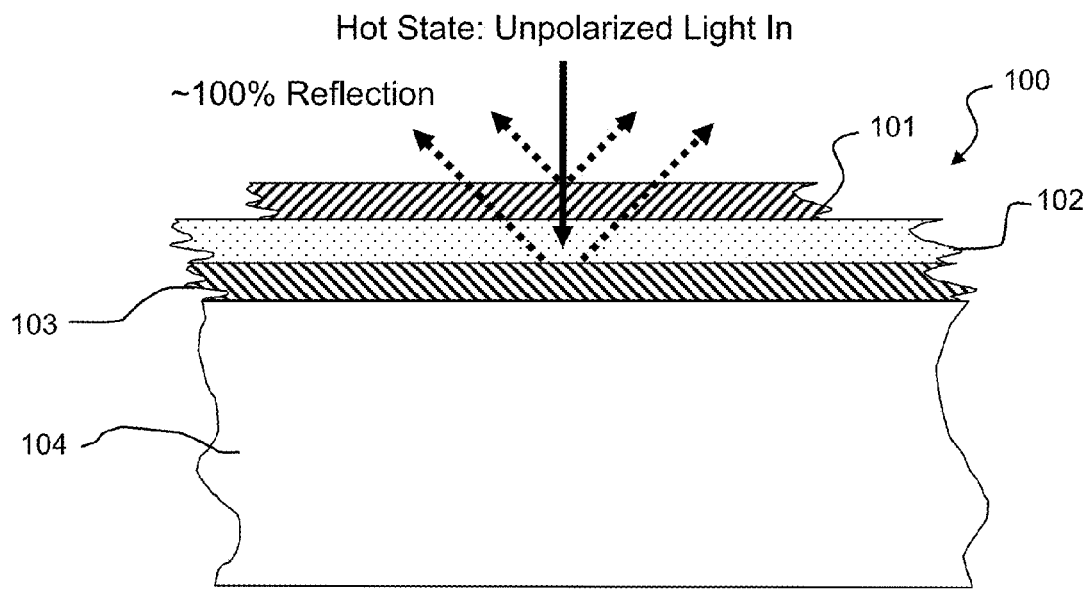
FIG. 1B is a schematic, cross-section view of the same thermoreflective filter in its hot or reflective state.

FIG. 1B was previously presented in U.S. patent application Ser. No. 12/172,156 to Powers et al., and is a schematic, cross-section view of the same exemplary thermoreflective filter device 100 as in FIG. 1, except that the action of incoming light is depicted for the hot state of the filter device 100. The thermotropic depolarizer 102 does not affect the polarization vector of the light passing through it. Thus, any light striking the inner reflective polarizer 103 is of perpendicular polarity to it, and approximately 100% of the incident light is reflected back. The filter device 100 therefore serves as a "full mirror" in its "hot state" that reflects approximately 100% of the light striking its outer surface.

Thus, in its cold state the filter device 100 may transmit slightly less than half the light energy which strikes its outer surface, whereas in its hot state the filter device 100 may in principle transmit substantially less than 1% of the light energy. As a result, the filter device 100 may be used to regulate the flow of light or radiant heat into a structure based on the temperature of the filter device 100.

This embodiment may be modified through the use of specialized reflective polarizers 101 and 103 whose design inherently limits glare. For example, circular polarizers made from cholesteric liquid crystals (CLCs) have the interesting property of being largely specular in transmission (i.e., they transmit a clear, minimally hazy image) but largely diffusive in reflection. Thus, when two reflective CLC circular polarizers of opposite handedness are stacked, the resulting reflection is diffuse, and resembles unpolished metal rather than presenting a mirrored surface.

Alternatively, the polarizers 101 and 103 may be retro-reflective polarizers. A retro-reflector is a device, film, surface, or substance that is reflective in nature, but which may tend to reflect light back in the direction of origin. Retroreflectors include beaded reflective surfaces, as well as other textured or microtextured reflective surfaces. Retroreflectors are used, for example, in movie screens and in reflective "invisibility cloaks" or optical camouflage materials onto which a background image may be projected. When a reflective polarizer is structured such that its reflections are retro-reflections, the polarizer will tend to reflect light sources back toward their points of origin so that, for example, the light of the sun may be reflected back toward the sun rather than out toward adjacent buildings or down to the street, which may tend to reduce the impression of glare from a building or other object.

Figure 2:
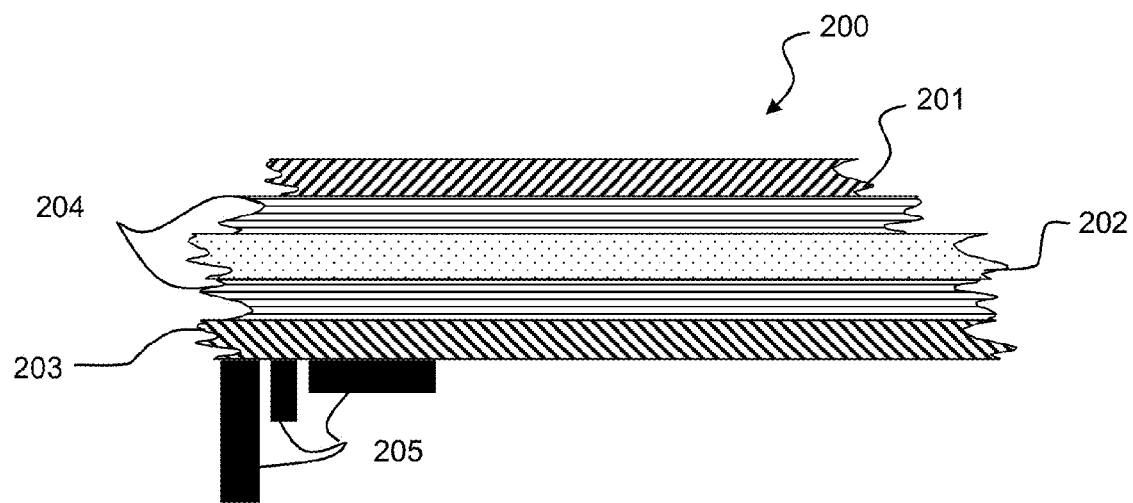
FIG. 2 is schematic representation of another type of thermoreflective filter, in which the thermoreflective filter may be an electroreflective filter with one or more temperature sensors and a control system.

FIG. 2 was previously presented in U.S. patent application Ser. No. 12/172,156 to Powers et al. and is a schematic representation of another type of thermoreflective filter device 200. As in the prior embodiment of FIGS. 1A and 1B, a depolarizer is sandwiched between a pair of reflective polarizers 201, 203 or perpendicular orientation. The thermotropic depolarizer has been replaced with an electrotropic depolarizer 202, plus two transparent electrodes 204 and a control system 205, which may collectively perform the same function as a thermotropic depolarizer. The control system 205 may include a thermometer, e.g., a thermocouple, that actuates the electrotropic depolarizer 202 upon transition between set temperature thresholds. The operation and use of this embodiment may otherwise be identical to operation and use of the embodiment shown in FIGS. 1A and 1B, although the thermoreflective filter device 100 may also be operated in a purely manual mode, e.g., through the activation of a power switch by an operator. In an alternative embodiment, retro-reflective or CLC circular polarizers, or other polarizer types that do not reflect a mirror-like image, may be employed to reduce glare.

Figure 3:
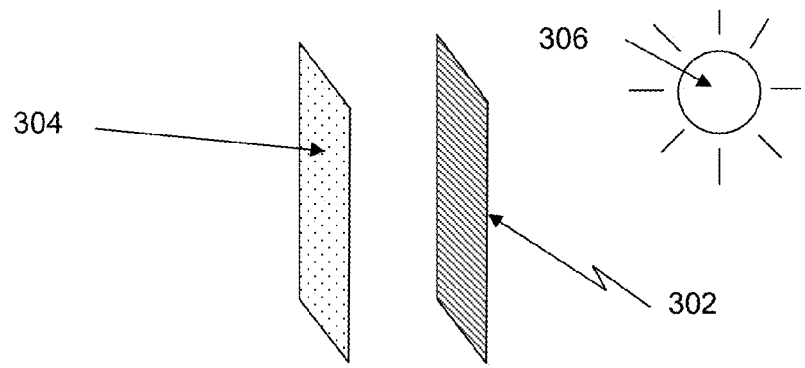
FIG. 3 is an exploded schematic view of an implementation of a variable or asymmetric diffuser positioned between a reflective surface and a light source to minimize glare.

FIG. 3 is an exploded schematic view of a variable or asymmetric optical diffuser 302 positioned between the outside world and a reflective or thermoreflective surface 304 as described in FIGS. 1A, 1B, and 2. Thus, under conditions allowing for diffusion, the reflection of an outside light source 306 (e.g., the sun) in a reflective or thermoreflective surface 304 may be diffused, producing a white or metallic gray finish rather than a mirror finish, and eliminating the "two suns" effect that may sometimes be associated with highly reflective building or vehicle surfaces. Since glare is primarily a function of specular rather than diffusive reflection of a bright light source, a white surface may generally be perceived as being much less glaring than a mirrored one, even if the total energy of reflected visible light is identical. Thus, this embodiment provides another method for reducing glare from mirrored surfaces.

In a simple implementation, the diffuser 302 may be a diffuser with properties that do not vary with temperature, wavelength, polarity, incidence angle, electric field, or other similar factors. However, such a diffuser may be less than 100% diffusing. In this case, the light transmitted through the reflective surface (e.g., a partially mirrored window) passes through the diffuser only once, whereas the light reflected from the surface must pass through the diffuser twice. Therefore, the reflected light may be more diffuse than the transmitted light.

In other implementations, the diffusive filter 302 may fall into any of three broad types: 1) a variable diffuser with a light-scattering ability that may be controlled by external factors such as temperature; 2) a selective diffuser that may only diffuse light of particular wavelengths or particular polarity, while having little effect on the transmission of other wavelengths or polarities; and 3) an asymmetric diffuser with a scattering ability that may be direction-dependent, such that light passing through in one direction is more strongly scattered than light passing through in the opposite direction. In all three cases, the underlying objective is the same, i.e., to break up reflected light under certain conditions while allowing transmitted light, under the same or other conditions, to pass through with little distortion or attenuation. An exemplary use of this method is to allow a building to possess highly reflective or thermoreflective windows for energy efficiency in a jurisdiction where mirrored surfaces are banned or discouraged.

It should be noted that for certain types of thermoreflective filters and for certain types of diffusers, the diffuser may be located inside the thermoreflective filter (e.g., between two of the layers in a multilayered device) without altering the essential functions of either the diffuser or the thermoreflective filter.

FIG. 4 is a schematic view of one embodiment of a variable diffuser, i.e., a thermodiffusive filter 400 that may be largely transparent at low temperatures and diffusive (or diffusively reflective) at high temperatures, or diffusive (or diffusively reflective) at low temperatures and transparent at high temperatures. The thermodiffusive filter 400 may be composed of a transparent material 402 in which beads or bubbles 404 of a second transparent material are suspended. The materials may be selected such that at low temperatures they have the same or very similar index of refraction, thus producing very little scattering or reflection of photons. However, at high temperatures one or both materials change their index of refraction such that a substantial mismatch exists between them. In this condition, the beads or bubbles 404 become reflective within the transparent material 402 (due to optical index mismatch) and, in cases where the beads or bubbles 404 are small and numerous, this may have a pronounced scattering effect.

By choosing the size and relative position of the beads or bubbles 404, the thermodiffusive filter 400 may be tuned such that its optical properties change with temperature. For example, the thermodiffusive filter 400 may be tuned such that it is a thermochromic diffusive Bragg reflector, diffusively reflecting certain frequency ranges of light. In another embodiment, the thermodiffusive filter 400 may be tuned to become a thermochromic diffusive scatterer operating over wide ranges of frequencies of light. In a further embodiment, the thermodiffusive filter 400 may be tuned to act as any of a thermochromic diffraction grating or disperser, thermochromic hologram, or other thermochromic optical device that reduces specularity of the reflected or transmitted light so as to reduce glare. An exemplary diffusive optical effect may be seen in river rapids, where opaque "whitewater" (i.e., water mixed with a large number of small, transparent air bubbles with a lower index of refraction than the water) can be seen alongside normal transparent water (with no air bubbles).

The temperature-dependent change in index or refraction may in principle be achieved by materials with high thermal expansion coefficients. Alternatively, one or both of the transparent materials 402 and 404 may be composed of a mixture of different materials which separate under certain conditions (e.g., above a certain temperature) or otherwise change their state or properties. However, the easiest way to produce this effect may be with materials that undergo a phase change at the desired temperature, such as a transition from liquid to solid or, in the case of a liquid crystal, any transition between nematic, smectic, crystalline, or isotropic states. In general this may produce a significant change in the index of refraction.

Since, in the mesophase (e.g., nematic and smectic states) liquid crystals may be anisotropic, the optical properties of beads or bubbles of liquid crystal suspended in a matrix (as in polymer dispersed liquid crystal devices) may be dependent on the orientation of the liquid crystal molecules. Many different ways to fix the orientation and structure of the liquid crystal in one or more states are known, including for example, using alignment layers or electric fields along with photo-polymerization. The orientation and structure of thermotropic liquid crystals is effected by temperature, and thus the anisotropy may be altered (or eliminated) by changing the temperature of the liquid crystal. One exemplary implementation of this embodiment utilizes a low-clearing point liquid crystal in a matrix structurally similar to polymer stabilized cholesteric or polymer diffusive liquid crystal devices, allowing phase changes due to changes in temperature (rather than electric fields) to effect optical transitions from transmissive to diffusive, or diffusive to transmissive. In another exemplary embodiment, the size and optical indices of the liquid crystal bubbles in a matrix structurally similar to polymer dispersed liquid crystal devices may be chosen such that a temperature-dependent diffusive reflection over one or more desired frequency ranges is achieved.

One exemplary use of this embodiment is to employ it in conjunction with a thermoreflective filter such that the transition temperature of the thermoreflective filter and that of the thermodiffusive filter are approximately the same. Thus, if the thermoreflective filter is 40% reflective in its cold state and 90% reflective in its hot state, and the thermodiffusive filter is 50% diffusive in its cold state and 80% diffusive in its hot state, then the total amount of specular reflection may remain approximately constant at a value of 20%, regardless of the state of the thermoreflective filter. Thus, the energy benefits of thermoreflective windows may be obtainable in a jurisdiction where building surfaces are legally restricted to 20% specular reflectivity. Another exemplary use of this embodiment is as a privacy filter.

A number of reflective, thermochromic implementations of this embodiment, which may change their reflective properties under the influence of temperature, may be practiced. One such device is a thermochromic, distributed Bragg reflector made such that the transmission, absorption, and/or reflection spectra are a function of temperature. Again, in this device liquid crystals may in fact be Bragg reflectors in which the reflection band is temperature-dependent. Distributed Bragg reflectors operate on the principle of mismatched optical indexes and the disclosed device may be considered a thermochromic version of a distributed Bragg reflector. Exemplary forms of thermochromic materials may include zinc oxide, which changes from clear to yellow when heated; liquid crystals, which can be formulated to absorb or reflect a percentage of the incident visible light above a given threshold temperature; and tungsten-doped vanadium oxides, which may reflect light above a threshold temperature determined in part by the percentage of tungsten in the composition of the material.

Differences in reflectivity of various liquid crystal formulations based on temperature depend on the formulation. In one formulation, the reflectivity may be altered with temperature due to a change in the index of refraction with temperature, and which is analogous to the electrochromic device known as polymer dispersed liquid crystal display. In another formulation, the reflectivity may be due to an internal structure which, at one temperature, reflects one circular polarization of light at certain frequencies and transmits the other circular polarization as well as other frequencies, while at other temperatures may transmit (or diffusively transmit) these frequencies. The behavior of such devices with temperature may be complicated, but may be analogous to the electrochromic devices known as cholesteric liquid crystal devices. Other formulations may be analogous to Guest-Host LCD displays, Halmeier displays, or polymer stabilized liquid crystal devices, though this list should not be considered exhaustive.

While each of these formulations may be used as a material in an exemplary thermochromic distributed Bragg reflector as depicted in FIG. 4, the liquid crystal formulations for which the index of refraction of the material is dependent on temperature may be particularly suitable. Using this liquid crystal formulation in a distributed Bragg reflector may result in a diffusive device analogous to the electrochromic PDLC or in a specular device similar to the 3M DBEF product, with either exemplary device having a wide-ranging number of thermochromic effects on haziness, center frequencies, bandwidths, and reflective efficiencies of the resulting devices. These devices may also have several distinct operations depending on the liquid crystal phase transition used. Exemplary transitions may include crystalline to nematic, nematic to isotropic, and smectic to nematic. Construction of one or more layers of liquid crystal inside or surrounded by suitable materials such as polymers may be a suitable materials technology for making thermochromic distributed Bragg reflectors. Exemplary forms may also have such layers with different transition temperatures or phase transitions, have liquid crystal mixtures which separate for such index changing effects, or additionally change their Raleigh scattering properties as well as optical index based on temperature.

The bubbles depicted in FIG. 4 may take a variety of forms other than, and distinct from, the spheroidal shapes depicted in the drawing. For example, the bubbles may be polyhedral, or may be greatly elongated in one or more dimensions such that they are effectively planar layers within the substrate material 402, without altering the essential function of the embodiment as a temperature-dependent variable diffuser.

FIG. 5 is a schematic view of another embodiment of a thermodiffusive filter 500 which relies on the self-organizing properties of certain materials, including liquid crystals. In one exemplary form of this embodiment, reflective dyes, reflective or refractive fibers, wire segments, macromolecules, or microscopic sheet fragments (e.g., flakes of mica) 502 may be suspended in a liquid crystal medium 504. In general, this may require the specific gravity of the materials such as fibers 502 to be identical or nearly identical to that of the liquid crystal 504 to prevent the two materials from separating over time. Alternatively, the materials such as reflective fibers 502 may be chemically functionalized such that they are dissolved rather than suspended in the liquid crystal, and thus tend to distribute themselves evenly throughout it rather than settling or separating out. It is possible for a microscopic fiber, wire segment, or other object to "dissolve" into a solvent without physically coming apart, in the same way that protein molecules and other substances are dissolved in human blood. Still another approach may be to attach the reflective fibers or flakes 502 to long polymer chains which are distributed throughout the liquid crystal 504 in a manner analogous to a wire screen covering a window, or vines of ivy covering a brick wall. In still a different approach, the fibers or flakes may be attached directly to the walls of an enclosure (e.g., the glass surfaces of a liquid crystal cell or "bottle").

The liquid crystal 504 and its alignment layer or layers (not pictured) may be designed such that at low temperatures the liquid crystal 504 is in an ordered state (whether crystalline, smectic, nematic, discotic, or otherwise) and at high temperatures (i.e., above the clearing point of the liquid crystal) it is in a disordered (i.e., liquid or isotropic) state. Furthermore, the orientation of the liquid crystal molecules may be such that in the ordered state, the minimum energy configuration for the wire segments 502 is to be oriented perpendicular to the plane of the thermodiffusive filter 500 of which they are a part. Thus, light passing through the filter at a normal angle sees a very small cross section for the fibers 502 and is minimally reflected or refracted. Furthermore, because of the ordered state of the material, any visual distortion introduced by the filter may be relatively uniform and may therefore not result in significant scattering.

Conversely, in the hot state the reflective fibers 502 may become disordered and assume random orientations within the liquid crystal 504. In this condition, they may present a larger cross-section to light passing through the filter 500, so that the total amount of reflection or refraction may be increased. However, because the fibers 502 may be small, randomly distributed, and randomly oriented, both reflection from and refraction through the fibers 502 may result in significant scattering of the incident light. Thus, in its hot state the filter 500 may act as an optical diffuser. The composition and design of liquid crystal materials and their alignment layers are well known and need no further elaboration here.

In a slightly different exemplary form of this embodiment, the fibers, flakes, or bubbles 502 may be buoyant, or attached to objects which are buoyant, such that their buoyancy may change with temperature and such that below a threshold temperature they either rise to the top or sink to the bottom of their enclosure and are no longer able to scatter the light passing through said enclosure. A so-called "Galileo thermometer" exhibits such buoyancy effects. Such a device may be configured to act as a thermodiffusive filter for reflective building and vehicle surfaces.

Alternatively, a thermally activated polarizer may be employed for this function. U.S. Pat. No. 6,965,420 to Li et al. describes a narrowband, circular polarizer made from cholesteric liquid crystals (CLCs) that switches to broadband operation when its structure is disrupted by an AC electric field. Such polarizers are capable of diffusive reflection or transmission of certain polarities of light. However, in the present application the polarizer may be switched from narrowband to broadband operation through temperature change, i.e., because of a phase transition in the CLC. The polarizer contains domains or bubbles of liquid crystal in a polymer matrix, and a disorganization of this structure can be achieved, for example, by a transition of the entrapped liquid crystal to an isotropic state above a given threshold temperature, defined by the exact structure and composition of the liquid crystal mixture.

In one exemplary form of this embodiment, a narrowband polarizer with a response in the near infrared is employed, such that its polarizing and possible diffusing effects are not visible to the human eye. However, when the temperature increases beyond a threshold value, the organization of the liquid crystal domains is disrupted, the bandwidth of the polarizer increases to cover some or all of the visible spectrum, and the polarizing and possible diffusing effects become visible. In this hot state, the thermally activated polarizer may serve as a visible light diffuser and may thus be used to mitigate glare as described above. In a further elaboration of this embodiment, a second thermally activated polarizer of opposite circular polarization may be added to enhance the diffusion and attenuation effects.

In still another exemplary form of this embodiment, the variable diffuser is a thermoreflective filter as described in FIGS. 1A and 1B, except that the polarizers employed are diffusive polarizers. Examples of diffusive polarizers include 3M's Diffuse Reflective Polarizing Film (DRPF), which is a linear polarizer, and Chelix CLC Polymer Circular Polarizers. In this instance, the thermodiffusive filter and the thermoreflective filter are combined into a single object, so that when the thermoreflective filter heats up and switches to its reflective state, it is simultaneously transitioning to a diffusive state such that it cannot reflect an image of the sun and produce glare.

Myriad other arrangements are possible which have the same effect of scattering small reflective or refractive objects 502 in the line of sight at high temperatures such that they have a diffusive effect. Either removing the objects 502 or reducing their cross-section at low temperatures such may eliminate or reduces their diffusive effects. A wide variety of configurations may meet this description and function as temperature-dependent, variable diffusers, and thus fit the embodiment shown in FIG. 4. This implementation of the technology does not consist of, or require, any particular structure. Rather, this method for reducing glare from reflective or thermoreflective surfaces may use any of a variety of different structures described herein, or other related structures that produce similar effects. Furthermore, although the composition and operating principles of this embodiment in its various exemplary forms may be different than those of the embodiment described in FIG. 4, the use of this embodiment may be essentially identical to that of FIG. 4.

Figure 6:
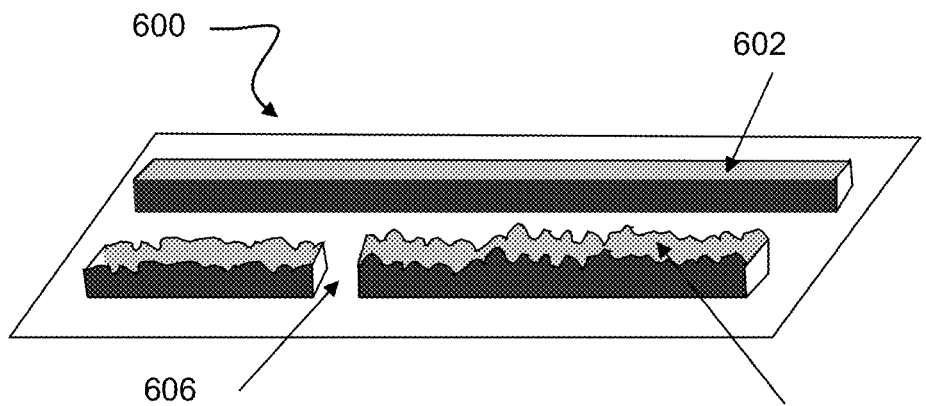
FIG. 6 is a schematic, isometric view of a wire grid polarizer wherein wires in a first orientation are smooth and regular and wires in a second orientation are irregular and rough.

FIG. 6 is an isometric view of a wire grid polarizer of the sort used in many thermoreflective filters, as described in FIGS. 1A and 1B. However, two different wire types are shown here for exemplary purposes. When placed in parallel at regular spacing, a multiplicity of smooth rectangular wires 602 may produce a reflective linear polarizer that transmits light of a matching polarity and reflects light of orthogonal polarity. Also, for wavelengths of light that are larger than the wire spacing and for photons of the reflected polarity, the smooth wires 602 may behave very much like a flat, solid metal film. Reflection from the polarizer surface may therefore be specular, resulting in a clear, mirror-like appearance.

However, when irregular wires 604 are used instead, the "surface" of the polarizer (as seen by photons of the appropriate wavelength and polarity) may appear irregular rather than smooth. Since specular reflection may require a microscopically smooth surface, while reflection from irregular surfaces may be diffusive, the reflected light from such a polarizer may have a white or metallic gray appearance, rather than a mirrored one. This effect may be most pronounced when the surface irregularities are larger than the wavelengths of the light being reflected, but too small to be perceived directly by the human eye. Thus, a wire grid polarizer fashioned from irregular wires 604 may act as a selective diffuser which transmits collimated light (i.e., clear images) of one linear polarity while diffusively reflecting light of the orthogonal linear polarity.

The addition of microscopic breaks or gaps 606 within the smooth wires 602 or irregular wires 604 may tend to have a refracting effect for the polarity of light that is transmitted through, and if the size and distribution of these gaps 606 is random or pseudo-random, then this refraction may be diffusive as well.

This implementation of the technology may exploit either or both of these effects to reduce the glare from thermoreflective surfaces, by constructing the thermoreflective filters from diffusive rather than specular wire grid polarizers. For example, a thermoreflective architectural window incorporating such a filter may transmit collimated light from the outside to the inside, allowing a clear view of the outside to building occupants. However, the reflection (aside from ordinary glass reflection caused by the refractive index mismatch between glass and air) from such a window may be diffusive rather than specular. Thus, the building may be able to reap the energy benefits of a thermoreflective window without producing the specular reflection that may lead to glare.

In addition, such a polarizer may be used by itself as a window film or filter, presenting a surface with approximately 50% diffusive reflection and 50% collimated transmission. Thus, the building may be able to reap the energy benefits of a reflective window without the glare effects caused by specular reflection. For the same reasons, such a polarizer could serve as an anti-glare film for a reflective wall or skin or body panels in vehicles or buildings.

Figure 7:
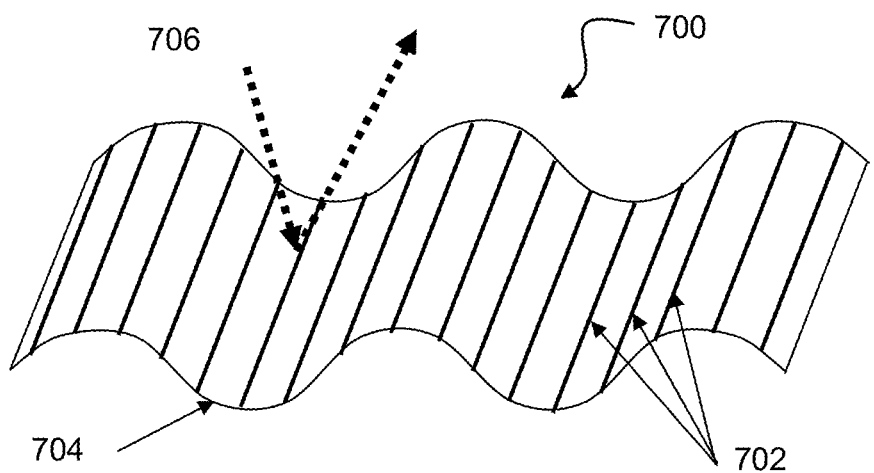
FIG. 7 is a schematic, isometric view of a wire grid polarizer wherein the wires may be placed on a non-flat substrate.

FIG. 7 shows another embodiment of a diffusive wire grid polarizer 700, in which the wires 702 (whether smooth or irregular) may be formed on a non-flat substrate 704. The height variations of the substrate 704 may be regular or irregular, along one or more axes of symmetry, with the result that reflection of incident light 706 from the wires 702 exhibits a dependency between incident angle and departure angle that varies with position on the substrate 704. Thus, the light of the polarity reflected by the wire grid polarizer 700 may be scattered (i.e., diffused), while the light of orthogonal polarity that is transmitted through the polarizer may not be significantly affected. Although the construction and operating principle of this embodiment may be slightly different from that of the embodiment described in FIG. 6, its use may be essentially identical.

Figure 8:
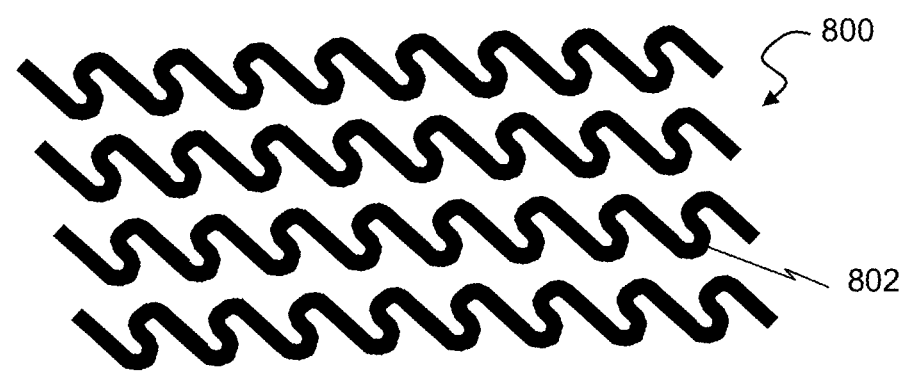
FIG. 8 is a schematic, plan view of a planar chiral metamaterial with asymmetric reflection and polarizing effects.

FIG. 8 shows a schematic plan view of another exemplary embodiment of wire grid polarizer 800 that has a complex nanostructure that provides the properties of a metamaterial, i.e., a material with strong resonance interactions for light passing through it at a certain range of directions, wavelengths, and polarities. In this embodiment, the wires of the wire grid polarizer 800 (whether smooth or irregular and whether formed on a flat or non-flat substrate) form a chiral (i.e., twisted) "fish scale" structure that may act as a circular polarizer (in contrast to wire grid polarizers with straight wires, which may act as linear polarizers). The degree of circularity in the polarization may be proportional to the chirality of the wire grid structure, i.e., a chirality of zero produces straight lines and thus linearly polarized light, and an intermediate chirality as depicted in FIG. 8 will produce elliptically polarized light which approaches circular polarization. Complete circularity may require an infinitely chiral structure, which at this time may not be physically realizable.

In addition, for wavelengths of light dependent on the size and spacing of the wires as described in Fedotov et al., this structure may have the additional property of being asymmetric in its polarizing effects. That is, light coming through from one orthogonal direction (i.e., from outside the page, traveling in) may be more strongly polarized than light coming through from the opposite orthogonal direction (i.e., from inside the page, traveling out). A linear structure may be geometrically equivalent when viewed from either side. However, a chiral structure may not be the same, i.e., the chirality of the structure when viewed from the back may be opposite to the chirality of the same structure when viewed from the front. This is the origin of the polarization asymmetry, such that the degree of polarization asymmetry, like the degree of circularity, may be proportional to the degree of chirality. One hundred percent asymmetry may require infinite chirality, i.e., a structure that likely cannot be physically realized. However, very high degrees of asymmetry have been achieved with manufacturable nanostructures.

When the wires 802 of this metamaterial wire grid polarizer 800 are fashioned to be irregular or are fashioned on an irregular surface such that the light reflected by them may be scattered and thus the polarizer may act as a diffusively reflective circular polarizer, the diffusive reflection effects may combine with the asymmetric polarization effects in an entirely novel way that would unlikely be achievable with classical optics. For non-prepolarized light, i.e., light of mixed random polarity (as with sunlight or artificial light that has not been reflected), the structure may be more diffusive to light passing through it in one direction than to light passing through in the opposite direction. In the extreme case, where the chirality is large, the result is a "one-way diffuser" that may transmit clear, collimated images in one direction with a theoretical transmissivity well in excess of 50% and that may reflect diffuse light in the opposite direction with a theoretical reflectivity approaching 50%.

In one exemplary application of this technology, this one-way diffuser may be laminated to windows as a privacy filter. Existing privacy filters may employ classical diffusive optics that are symmetrically diffusive, i.e., they may obscure the view from the inside looking out just as much as they obscure the view from the outside looking in. By contrast, the one-way diffuser may be oriented such that it may provides a clear view from the inside looking out, and a highly diffusive view from the outside looking in. In addition, this filter may have all the solar heat gain reduction and glare reduction advantages already cited for diffusively reflective polarizing filters. Thus, it may provide a uniquely powerful solution to several different window problems at the same time.

In another exemplary application, the one-way diffuser may be employed in conjunction with a reflective or thermoreflective building surface for glare reduction, i.e., to diffuse the light reflected from this surface without significantly diffusing the light, if any, passing through the surface. In still another exemplary application, a thermoreflective filter of the sort depicted in FIGS. 1A and 1B may be constructed using chiral wire grid polarizers, whether specular or diffusive, as the reflective polarizers 101 and 103.

In still another exemplary application, the chiral wire grid polarizer (whether specular or diffusive) may be employed in a structure closely resembling the thermoreflective filter depicted in FIGS. 1A and 1B, except that the inner polarizer 103 has been replaced with a simple specular reflector (whether fully or partially reflective). A linear structure may be geometrically equivalent to its own reflection, so that the image of a linear polarizer, when reflected in a mirror, appears identical to the polarizer itself. However, a chiral structure is not the same when reflected, i.e., the chirality of the reflection may be opposite to the chirality of the original structure. As a result, the reflected image of a left circular polarizer appears to be a right circular polarizer. Thus, unlike a linear polarizer, a circular polarizer may interact with its own reflection, and a structure equivalent to the thermoreflective filter in FIGS. 1A and 1B may be constructed using only one polarizer. This may be done for reasons of cost, manufacturability, or for other reasons.

Many optional enhancements may be made to this chiral metamaterial polarizer 800 without altering its fundamental nature. For example, the chiral wire structures 802 may be formed on the substrate such that they are not completely parallel, or such that the "fish scales" are not all identical in size and orientation. Alternatively, or in addition, the wires 802 may not be continuous, but may instead be composed of multiple segments, each exhibiting one or more of the chiral "fish scale" structures. These segments may generally be longer than ¼ of the wavelength of light they are intended to interact with, while less pronounced effects may be observed with smaller wire segments. Multiple layers of chiral polarizer, with identical or nonidentical properties, may be stacked to enhance their effects or broaden the range of wavelengths or polarities over which they respond.

The exact optical properties of the chiral wire grid polarizer may be tuned by varying the width, height, spacing, and surface roughness of the wires; the spacing, diameter, chirality, and staggering or tesselation of the fish scale structures along the wires 802, and the degree of rippling, warping, or roughness of the underlying substrate. In addition, the optical properties of the chiral polarizer may be strongly affected by the choice of metal from which the wires are made.

In addition, although the roughened, chiral wire grid structure has been described here for exemplary purposes, this is by no means the only structure capable of producing asymmetric polarizing effects and/or asymmetric diffusion effects. This implementation of the technology is not limited to a particular structure, but is rather a method for reducing glare from reflective surfaces using any of a variety of different structures with similar effects.

Figure 9:
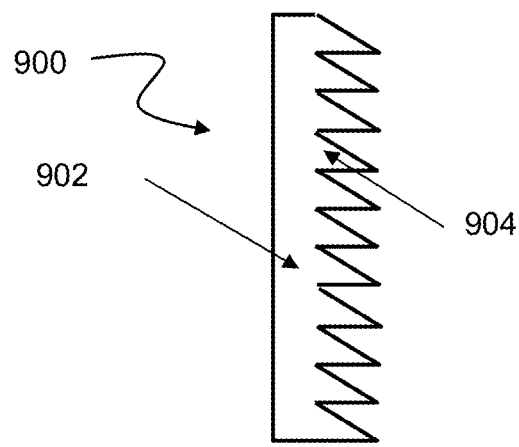
FIG. 9 is a schematic, cross-section view of a prismatic optical film that bends light passing through it such that it emerges only at particular angles.

FIG. 9 is a schematic, cross-section view of another embodiment of a selective diffuser 900, a prismatic film in which the degree of scattering, bending, or diffusion of the light passing through it may be strongly dependent on the incidence angle. An exemplary method for accomplishing this involves etching the surface of a transparent substrate 902 with a pattern of sawtooth structures 904, although numerous other methods are possible. Examples of prismatic films include the "privacy filters" that can be added to laptop screens or video displays to widen or narrow their viewing angle. In this embodiment, the prismatic film may be placed on top of a reflective surface (e.g., a partially mirrored or thermoreflective window), such that reflections from the surface may be restricted to certain exit angles. This may be done to reduce glare at particular angles (e.g., to prevent a building from reflecting sunlight onto a nearby roadway), or to direct reflected light in particular directions or onto particular objects (e.g., a solar collector or sunless courtyard), or for other reasons.

Figure 10:
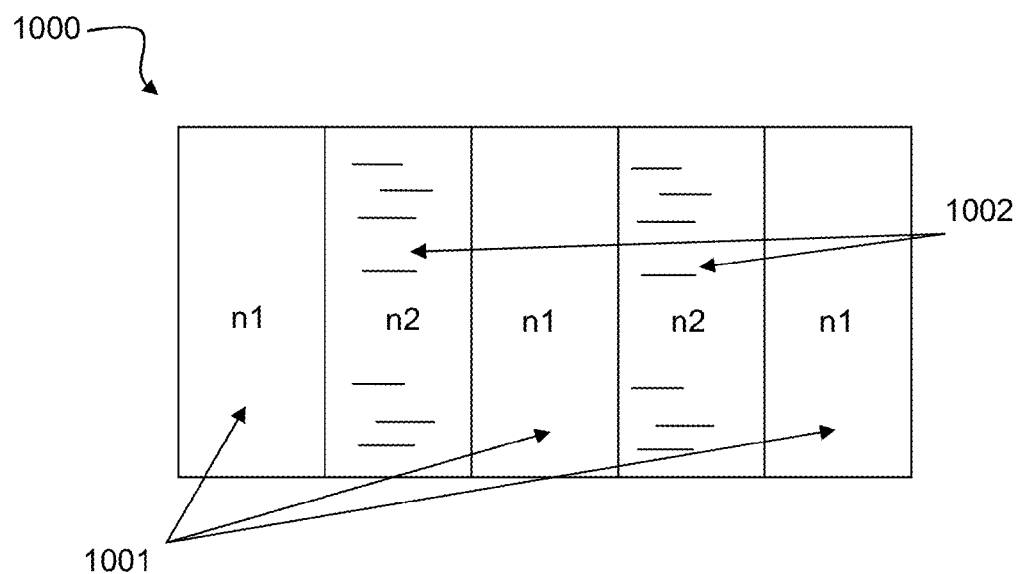
FIG. 10 is a schematic view of an exemplary form of a thermochromic, thermotropic distributed Bragg reflector in its cold (i.e., organized and transparent) state.

FIG. 10 is a schematic, cross-section view of an exemplary thermotropic distributed Bragg reflector (DBR) 1000 in its cold (organized, transparent) state. The thermotropic DBR 1000 may be composed of alternating transparent or translucent layers of a first material 1001 and a second material 1002, wherein the second material 1002 is thermotropic (e.g., a thermotropic liquid crystal), such that in its cold, organized state (e.g., a crystalline, nematic, or smectic state) it has an index of refraction n2 which may be similar or identical to an index of refraction n1 of the first material 1001. Light passing through the stack may therefore not be significantly affected by the different composition of the layers. However, in the hot, disorganized (e.g., isotropic) state, the index of refraction n2 of the second material 1002 may be significantly different than the index of refraction n1 of the first material 1001, such that photons passing through the material stack may experience a periodic variation in refractive index and thus distributed Bragg reflection may occur.

Figure 11:
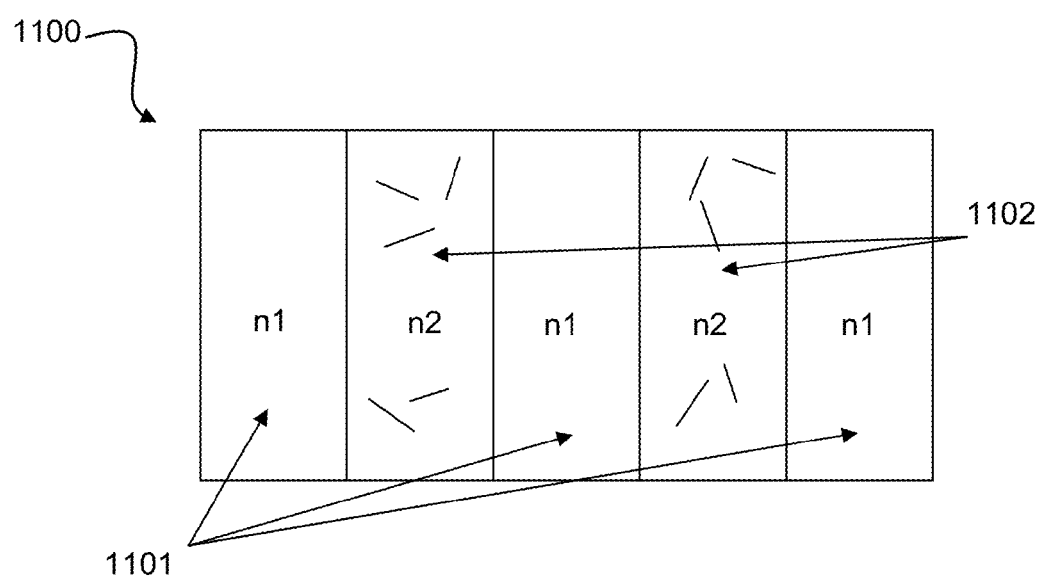
FIG. 11 is a schematic view of the distributed Bragg reflector of FIG. 10 in its hot (i.e., disorganized and reflective) state.

FIG. 11 is a schematic, cross-section view of the thermotropic DBR 1100 of FIG. 10 in its hot (disorganized, reflective) state. In this state, the second material 1102 may be in a liquid, isotropic state and may have a significantly different index of refraction n2 than the index of refraction n1 of the first material 1101. Layering of materials with different index of refraction may produce a distributed Bragg reflection response. Several different liquid crystal layers may be employed as the second material 1102, either with different melting temperatures or different indices of refraction, or both, without departing from the spirit of this embodiment.

Another embodiment of a thermotropic DBR may use polymer layers similar in formulation, for example, to 3M DBEF polarizer, which expand thermally and thus exhibit a different spatial frequency and respond to different wavelengths of light. However, in embodiments of FIGS. 10 and 11, the birefringence of the LC layers of a thermotropic liquid crystal device may be used to achieve the same effect as the polymer layers of DBEF that have different optical indices in different transverse directions. Alternatively a liquid crystal may be used such that the index of refraction is the same in the transverse directions, and other components or layers of the DBR can have different indices in different directions, or both.

By using multiple layers of materials with different temperature responses, in theory any or all of the properties of the reflector may be affected. A thermotropic DBR may thus additionally be designed as a "disappearing" polarizer, such that the polarization effect appears or disappears as the temperature rises or falls. The thermotropic DBR may also be designed to have other effects, for example, a variable center frequency polarizer, a variable bandwidth polarizer, or a variable efficiency polarizer, or as a hybrid thermochromic DBR (TDBR) and thermochromic polarizer.

Both a thermochromic polarizer and TDBR may be used, among other things, to reduce the amount of glare in optical devices (for example, in a thermoreflective filter as disclosed in U.S. patent application Ser. No. 12/172,156), by configuring the devices to not switch completely "on" at one temperature, thereby reducing glare at "intermediate temperatures" temperatures. Alternatively, the thermochromic polarizer and TDBR may increase or decrease the reflected bandwidth by such devices to reduce glare; adjust a center bandwidth by temperature to reduce glare; operate in frequencies where optical glare does not occur such as IR and UV light; or configure a device which reflects similar amounts of visible light at low and high temperatures, but reflects less or more UV and IR at these temperatures. Since the TDBR may be either specular or diffusive, a thermochromic polarizer using a Bragg reflector may similarly be either specular or diffusive. Additionally, electrochromic "overrides" of the thermochromic embodiments may be employed such as, for example, a distributed Bragg reflector in which electric signals may additionally change the behavior of the device at one or more temperatures.

It may be possible to choose both the sizes of the liquid crystal molecules used in such TDBRs and polarizing TDBR (PTDBRs) in particular configurations such that their action is primarily or wholly in the NIR and IR. This selection may reduce glare by reducing the amount of visible light reflected. The devices may also be designed such that the amount of light reflected in the visible spectrum is below a design limit in the various active temperature ranges. These exemplary devices, including in diffusive, specular, and hybrid embodiments, along with electrochromic "override" versions, are all considered implementations of the invention and are merely exemplary and not exhaustive.

Note that IR TDBR and IR PTDBR devices may redshift the light passing through at off-normal angles, which theoretically means that devices designed for glare reduction by utilizing only NIR or longer visible wavelengths such as red should have less visible light glare at "off-angles" than at normal, which may be desirable in a glare management device.

TDBR and PTDBR devices may be innately diffusive, or can alternatively be put behind a diffuser that operates at one or more frequencies. In one exemplary embodiment, a diffusive, glare-reducing version of a PTDBR uses PDLC technology with a vertical mode device, a high pre-tilt alignment layer (an exemplary device might have a pre-tilt angle above 75 degrees), and a positive mode, where the index of refraction may be matched at low temperatures and where the index transitions from a nematic to isotropic phase change. This may result in a TDBR when the device is at a high temperature, which disappears when at a lower temperature below the clearing point. Similar effects on polarization may be effected using these methods.

PSCT, PDLC, and Guest Host versions of both TDBR and PTDBR devices are possible, as well as hybrid devices. Guest Host embodiments using absorptive or reflective dyes may be aligned such that they do not reflect or absorb until a phase transition occurs or a set-point temperature is reached. These embodiments may reduce glare by choosing which frequencies to reflect in bands, including IR. Guest Host embodiments may be particularly suitable for PTDBR devices. Another embodiment may use diffusive versions of TDBR and PTDBR devices at IR wavelengths in combination with specular versions at visible wavelengths to increase the efficiency while allowing choice of visible reflectivity for aesthetic reasons. Hybrid TDBR and PTDBR devices are also embodiments of this device. This list of embodiments is merely exemplary and devices made from all suitable materials (metal, solids, gases, liquids, liquid crystals, dichroics, photonic crystals, and other materials) are contemplated.

There are many desirable qualities in a thermochromic or thermoreflective liquid crystal filters and devices for use in windows and building materials that can be achieved through mixtures of liquid crystals and mixtures including liquid crystals. These may include designing the freezing and clearing points of the mixture to make them suitable for a particular climate or for controlling the temperature range of the hot and cold state or the entrance and exit of heat through the device. Additionally, these may include mixtures designed to affect the speed, optical clarity, and/or light absorption, reflection, or transmission properties between the hot and cold states or other physical states (e.g. the transition between crystalline and nematic states), as well as mixtures designed to improve the stability of the functional responses of the device (such as optical properties, freezing or clearing points, or transition speed) to environmental conditions (e.g., exposure to UV or other light, humidity, gases, thermal cycling, or temperature extremes). The construction details of these embodiments may be variable while adhering to the spirit of a method for reducing glare from reflective or thermoreflective surfaces.

Figure 12:
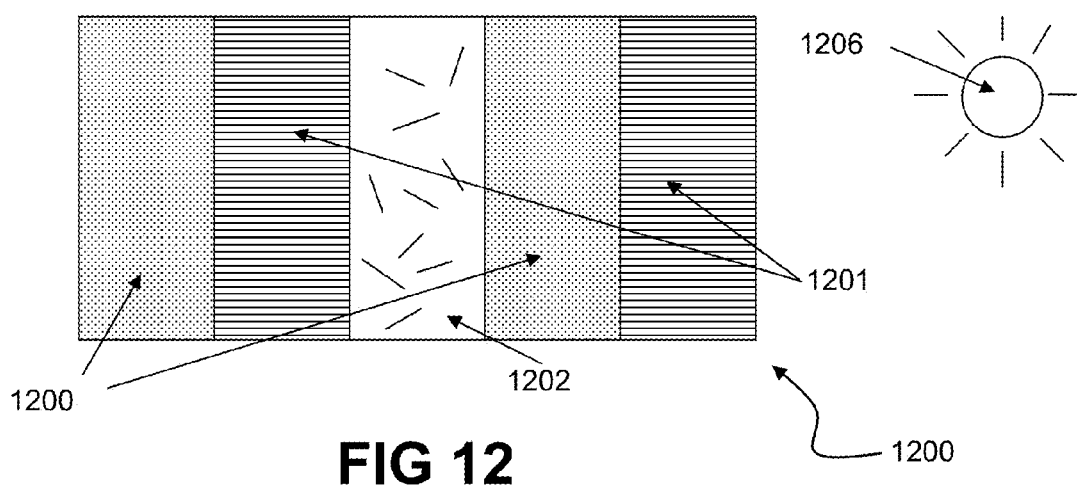
FIG. 12 is a schematic view of another embodiment of a thermoreflective filter that may alternate reflective and absorptive polarizers in order to minimize interior reflection.

FIG. 12 is a schematic view of another embodiment of a glare mitigation device 1200 that alternates reflective and absorptive polarizers in order to minimize interior reflection. When unpolarized light from an exterior source 1206 (e.g., the sun) strikes the device 1200, it encounters a reflective polarizer 1201. Of the incoming light, approximately 50% may have polarization perpendicular to that of the reflective polarizer 1201 and may be reflected away. The remaining light may have matching polarization and may be transmitted through.

Once the incoming light passes through the outer reflective polarizing filter 1201, the incoming light then enters an absorptive polarizer 1203 with a polarization vector which may be matched to that of the reflective polarizer 1201. Because the light passing through this absorptive polarizer 1203 has been prepolarized by the reflective polarizer 1201, its polarity matches that of the absorptive polarizer 1203 and thus very little of the light may be absorbed, and a large majority of it may be transmitted through.

Next, the transmitted light encounters a thermotropic depolarizer 1202, which is a device or material capable of exhibiting two different polarizing states. In its hot or isotropic or liquid state, the polarized light passing through the thermotropic depolarizer 1202 may not be affected. In its cold (e.g., nematic or crystalline) state, the thermotropic depolarizer 1202 may rotate the polarization vector of the incoming light by a fixed amount.

Once it has passed through the thermotropic depolarizer 1202, the remaining polarized light strikes an inner reflective polarizer 1201', also known as the "analyzer," where it may be either reflected or transmitted, depending on its polarization state. The inner reflective polarizer 1201' may be oriented such that its polarization is perpendicular to that of the outer reflective polarizer 1201. Thus, in a hot state, when the polarization vector of the light has not been rotated, the polarity of the light is perpendicular to that of the inner reflective polarizer 1201' and a majority of the light (in theory, up to 100%) may be reflected. However, in the cold state, when the polarization vector of the light has been rotated by 90 degrees and is parallel to the inner reflective polarizer 1201', a small amount of the light may be absorbed by the polarizer material and the rest may be transmitted through. Finally, the light encounters an inner absorptive polarizer 1203' of matched polarity and is transmitted through.

Thus, for exterior light passing through into the interior of a building, vehicle, or other structure, the behavior, performance, and appearance of this embodiment may be extremely similar to those of the device described in FIGS. 1A and 1B, i.e., the device may be reflective when hot and transmissive when cold. However, for light passing the other way, from the interior of a building, vehicle, or other structure into the external environment, the performance and appearance may be significantly different, because the light rejected in the hot state may be absorbed rather than reflected.

When unpolarized light from an interior source strikes the device 1200, it encounters the inner absorptive polarizer 1203'. Of the incoming light, approximately 50% will have polarization perpendicular to that of the inner absorptive polarizer 1203' and will be absorbed. The remaining light will have matching polarization and will be transmitted through.

Once it has passed through the inner absorptive polarizing filter 1203', the incoming light then enters the inner reflective polarizer 1201' with a polarization vector matched to that of the inner absorptive polarizer 1203'. Because the light passing through this inner reflective polarizer 1201' has been prepolarized by the inner absorptive polarizer 1203', its polarity matches that of the inner reflective polarizer 1201' and thus very little of the light may be reflected, and a large majority of it transmitted through.

Next, the transmitted light encounters the thermotropic depolarizer 1202, such that in its hot or isotropic or liquid state, the polarized light passing through the thermotropic depolarizer 1202 may not be affected, whereas in its cold (e.g., nematic or crystalline) state, the thermotropic depolarizer 1202 may rotate the polarization vector of the incoming light by a fixed amount.

Once it has passed through the thermotropic depolarizer 1202, the remaining polarized light strikes the outer absorptive polarizer 1203, where it may be either reflected or transmitted, depending on its polarization state. The outer absorptive polarizer 1203 may be oriented such that its polarization is perpendicular to that of the inner absorptive polarizer 1203'. Thus, in the hot state, when the polarization vector of the light has not been rotated, the polarity of the light is perpendicular to that of the outer absorptive polarizer 1203 and a majority of the light (in theory, up to 100%) is absorbed. However, in the cold state, when the polarization vector of the light has been rotated (e.g., by 90 degrees) and is parallel to the outer absorptive polarizer 1203, a small amount of the light may be absorbed by the polarizer material and the rest is transmitted through. Finally, the light passes through a reflective polarizer 1201 of matched polarity and may be transmitted through.

This arrangement may allow a thermoreflective filter to reflect away radiant energy (e.g., sunlight and/or infrared solar heat) coming from outside a structure, without also presenting a mirrored surface to the inside of the structure. This may mean, for example, that unlike an ordinary mirrored or thermoreflective film which may reflect the building interior at night and thus not allow an exterior view at night, this embodiment may allow a clear (though attenuated) view of the outside, even when the light inside the building or other structure is brighter than the light outside of it. This may be desirable, for example, in residential windows where a nighttime view of the stars or city lights is generally expected. Thus, this embodiment is intended to reduce interior glare, while allowing the exterior appearance of the filter to be that of a specular mirror. However, this arrangement may be combined with any of the other glare reduction methods described above, and may also be turned around to present an absorptive appearance to the structure's exterior and a reflective appearance to the interior (which may be desirable, for example, in solar ovens or other structures designed to absorb and retain large amounts of solar heat).

Additional polarizers or other optical elements may also be added to produce different optical effects without affecting the methods for reducing glare from reflective and thermoreflective surfaces disclosed herein. In addition, the thermotropic depolarizer 1202 may optionally be deleted, resulting in a film, device or, optical stack with optical properties that may not vary with temperature. However, this film or device or stack would have the interesting property of being reflective in one direction and absorptive in the other, and thus function as an alternate structure for reducing glare from reflective surfaces While several exemplary embodiments are depicted and described herein, it should be understood that the present invention is not limited to these particular configurations. Optional components such as coatings, films, spacers, fillers, or support structures may be added to suit the needs of a particular application or a particular manufacturing method, and degraded forms of some embodiments can be produced by deleting or substituting certain components. For example, the wires of a wire grid polarizer could be fashioned from imperfect conductors or semiconductors, or from materials (e.g., copper) whose reflection spectra include substantial color anomalies.

The exact arrangement of the various layers can be different than is depicted here and, depending on the materials and wavelengths selected, different layers can be combined as single layers, objects, devices, or materials, without altering the essential structure and function of the invention. For example, the wire segments in the thermodiffusive filter of FIG. 5 could also form the wires of an irregular wire grid polarizer as described in FIGS. 6 and 7.

Although the description above contains many specificities, these should not be construed as limiting the scope of the invention but rather construed as merely providing illustrations of certain exemplary embodiments of this invention. There are various possibilities for making the implementation of different materials and in different configurations.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. All directional references e.g., proximal, distal, upper, lower, inner, outer, upward, downward, left, right, lateral, front, back, top, bottom, above, below, vertical, horizontal, clockwise, counterclockwise, left circular, and right circular are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Percentages of reflection, transmission or absorption are illustrative and shall not be limiting. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. An energy-efficient device that reduces glare from reflection of incident light comprising a first reflective polarizer;
   a second reflective polarizer;
   a thermochromic depolarizer positioned between the first reflective polarizer and the second polarizer;
   a transparent substrate affixed to the second reflective polarizer; and
   an at least partially diffusive filter affixed to the first reflective polarizer.

2. The energy-efficient device of claim 1 further comprising incorporating an electrochromic depolarizer in conjunction with the thermochromic depolarizer.

3. The energy-efficient device of claim 1, wherein the at least partially diffusive filter is a variable diffuser with a light scattering ability controllable by one or more external conditions.

4. The energy-efficient device of claim 3, wherein the one or more external conditions comprise a temperature and/or an applied electric field.

5. The energy-efficient device of claim 3, wherein the variable diffuser further comprises a thermodiffusive filter that is mostly transparent within a first temperature range and that is mostly diffusive within a second temperature range.

6. The energy efficient device of claim 5, wherein the thermodiffusive filter comprises
   a first transparent material; and
   beads or bubbles of a second transparent material, wherein
      within a first temperature range, an index of refraction of the first transparent material is substantially the same as an index of refraction of the second transparent material; and
      within a second temperature range, one or both of the index of refraction of the first transparent material and the index of refraction of the second transparent material change such that there is a substantial mismatch between the index of refraction of the first transparent material and the index of refraction of the second transparent material.

7. The energy efficient device of claim 6, wherein the first transparent material and the second transparent material are selected such that the thermodiffusive filter functions as a thermochromic diffusive Bragg reflector.

8. The energy-efficient device of claim 1, wherein the partially diffusive filter is a selective diffuser that only diffuses light of particular wavelengths or particular polarities.

9. The energy-efficient device of claim 1, wherein the partially diffusive filter is an asymmetric diffuser that scatters light passing through the device in a first direction more strongly than light passing through the device in a second direction.

* * * * *